United States Patent
Montgomery et al.

(10) Patent No.: US 9,192,280 B2
(45) Date of Patent: Nov. 24, 2015

(54) METHOD AND SYSTEM FOR DETECTING AND REMOVING A CLOGGING CONDITION OF A FILTER IN A DISHWASHER

(71) Applicant: ELECTROLUX HOME PRODUCTS, INC., Charlotte, NC (US)

(72) Inventors: Mark D. Montgomery, Greenville, NC (US); Dennis A. Poyner, Kinston, NC (US); Virgil J. Francisco, Ayden, NC (US); James L. Burrows, Winterville, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 132 days.

(21) Appl. No.: 13/708,530

(22) Filed: Dec. 7, 2012

(65) Prior Publication Data

US 2014/0158163 A1    Jun. 12, 2014

(51) Int. Cl.
| | |
|---|---|
| *B08B 3/00* | (2006.01) |
| *B08B 3/02* | (2006.01) |
| *A47L 25/02* | (2006.01) |
| *A47L 15/02* | (2006.01) |
| *A47L 15/42* | (2006.01) |

(Continued)

(52) U.S. Cl.
CPC ......... *A47L 15/0018* (2013.01); *A47L 15/0002* (2013.01); *A47L 15/4208* (2013.01); *A47L 15/4225* (2013.01); *B01D 29/66* (2013.01); *A47L 15/4244* (2013.01); *A47L 2401/09* (2013.01); *A47L 2501/05* (2013.01)

(58) Field of Classification Search
CPC ........ B08B 3/00; B08B 3/02; A47L 2501/05; A47L 2401/08; A47L 2401/09
USPC ...................................... 134/10, 18, 25.2, 42
See application file for complete search history.

(56) References Cited

U.S. PATENT DOCUMENTS

| 4,559,959 A | 12/1985 | Meyers |
| 5,700,329 A | 12/1997 | Edwards et al. |

(Continued)

FOREIGN PATENT DOCUMENTS

| DE | 43 10 403 A1 | 10/1994 |
| DE | 4400877 A1 | 7/1995 |

(Continued)

OTHER PUBLICATIONS

International Search Report and Written Opinion for Application No. PCT/US2013/073553 dated Feb. 18, 2014.

*Primary Examiner* — Saeed T Chaudhry
(74) *Attorney, Agent, or Firm* — Alston & Bird LLP

(57) ABSTRACT

Embodiments of the present invention relate to methods and systems for detecting and removing a clogging condition of a filter in a dishwasher. According to one embodiment, the method includes determining a normal water level or a normal rate of water level change for a wash cycle of the dishwasher and monitoring a water level or a rate of water level change during execution of the wash cycle. The method further includes detecting the clogging condition of the filter by detecting a deviation thereof. A current position of the wash cycle being executed may then be determined. The method further includes executing a remedial operation to facilitate removal of the clogging condition and determining if the clogging condition has been removed. Finally, the method includes resuming operation of the dishwasher at a wash cycle position based on the current position if the clogging condition has been removed.

13 Claims, 13 Drawing Sheets

(51) Int. Cl.
*A47L 15/00* (2006.01)
*B01D 29/66* (2006.01)

(56) References Cited

U.S. PATENT DOCUMENTS

| | | | |
|---|---|---|---|
| 5,900,070 A | 5/1999 | Jarvis et al. | |
| 5,909,743 A | 6/1999 | Thies et al. | |
| 6,103,017 A | 8/2000 | Thies et al. | |
| 6,182,674 B1 | 2/2001 | Jozwiak et al. | |
| 6,432,216 B1 | 8/2002 | Thies | |
| 6,544,344 B2 | 4/2003 | Hegeman et al. | |
| 6,615,853 B2 | 9/2003 | Hegeman et al. | |
| 6,811,617 B2 | 11/2004 | Elick et al. | |
| 6,997,193 B2 | 2/2006 | Elick et al. | |
| 7,146,992 B2 | 12/2006 | Elick et al. | |
| 7,241,347 B2 | 7/2007 | Elick et al. | |
| 7,252,101 B2 | 8/2007 | Elick et al. | |
| 7,255,113 B2 | 8/2007 | Elick et al. | |
| 7,409,961 B2 | 8/2008 | Elick et al. | |
| 7,472,711 B2 | 1/2009 | Johnson et al. | |
| 7,472,712 B2 | 1/2009 | Ashton et al. | |
| 7,681,582 B2 | 3/2010 | Wetzel et al. | |
| 7,789,968 B2 | 9/2010 | Elick et al. | |
| 2005/0051201 A1* | 3/2005 | Ashton et al. | 134/104.1 |
| 2006/0130878 A1 | 6/2006 | Lee et al. | |
| 2006/0237048 A1 | 10/2006 | Weaver et al. | |
| 2006/0237049 A1 | 10/2006 | Weaver et al. | |
| 2006/0237052 A1 | 10/2006 | Picardat et al. | |
| 2007/0181156 A1 | 8/2007 | Uz et al. | |
| 2007/0283982 A1 | 12/2007 | Elick et al. | |
| 2012/0006360 A1* | 1/2012 | Rosenbauer | 134/18 |

FOREIGN PATENT DOCUMENTS

| | | | |
|---|---|---|---|
| DE | 44 00 887 A1 | | 8/1995 |
| DE | 102 44 242 A1 | | 3/2004 |
| DE | 102 44 243 A1 | | 3/2004 |
| DE | 10244242 | * | 3/2004 |
| DE | 102 46 017 A | | 4/2004 |
| DE | 10246017 | * | 4/2004 |
| DE | 10 2004 003077 A1 | | 8/2005 |
| EP | 1 464 268 A2 | | 10/2004 |

* cited by examiner

METHOD AND SYSTEM FOR DETECTING AND REMOVING A CLOGGING CONDITION OF A FILTER IN A DISHWASHER

FIELD

Embodiments of the present invention relate to dishwashers and, more particularly, to a method and an associated system for detecting and removing a clogging condition of a filter in a dishwasher.

BACKGROUND

Dishwashers have become an integral part of everyday household use. Typical dishwashers use water pumped into a tub to clean dishes and utensils during wash cycles. Dishwasher tubs comprise a sump with a filter that separates food soils from wash water. The soils exit the tub through the drain and the wash water falls through the filter to a circulation pump that re-circulates the water through the tub via spray arms. Sometimes, however, the filter can become clogged with soils, overwhelming the filter and preventing or slowing the passing of wash water through the filter. In this case, a lack of water below the filter causes the circulation pump to suck in air, which may cause the circulation pump to become starved (run dry), lose its prime, or stop pumping altogether. These conditions may ultimately damage the circulation pump if not treated quickly.

SUMMARY OF THE INVENTION

In light of the foregoing background, embodiments of the present invention provide an effective method and system for detecting and removing a clogging condition of a filter in a dishwasher. In particular, some embodiments of the present invention utilize logic along with a water level sensor (e.g., a pressure sensor) positioned above or below the filter to detect and remove a clogging condition. Some embodiments are configured to execute as a safety procedure during operation of the dishwasher and are configured to interrupt the wash cycle operation of the dishwasher upon detection of a clogging condition, attempt an appropriate remedial operation, and/or resume operation of the dishwasher upon removal of the clogging condition.

One embodiment is directed to a method for detecting and removing a clogging condition of a filter in a dishwasher. The method includes determining at least one of a normal water level for a wash cycle of the dishwasher or a normal rate at which the water level changes. The method further includes monitoring at least one of a water level during execution of the wash cycle (e.g., with a pressure sensor) or a rate at which the water level changes during execution of the wash cycle. The method further includes detecting the clogging condition of the filter. The clogging condition is indicated by at least one of a deviation of the monitored water level from the normal water level or a deviation of the monitored rate at which the water level changes from the normal rate at which the water level changes. The method further includes determining a current position of the wash cycle being executed. The method further includes executing a remedial operation to facilitate removal of the clogging condition from the filter. The method further includes determining if the clogging condition has been removed following execution of the remedial operation. The method further includes resuming operation of the dishwasher based at least on the current position in the wash table if the clogging condition has been removed.

In some embodiments, the method further includes executing the remedial operation by determining the remedial operation based on a degree at which the filter is clogged. In some embodiments, the method further includes executing the remedial operation by determining the remedial operation based predefined rules.

In some embodiments, the method further includes executing the remedial operation by selecting the remedial operation from a list of remedial operations. In such embodiments, the list of remedial operations may define a hierarchy of remedial operations that each corresponds to a degree at which the filter is clogged. Additionally, in some embodiments, the method further includes executing a second remedial operation if the clogging condition has not been removed. In such embodiments, the second remedial operation may be ranked higher in degree than the first remedial operation in the list of remedial operations. In some embodiments, the method further includes executing the remedial operation by executing at least one of the following remedial operations: switching to lower spray arm operation or to other dedicated spray jets to sweep the soils off the filter and into the drain, adding water above the filter, adding water below the filter, operating a circulation pump at a reduced speed, pulsing operation of the circulation pump, or operating a drain pump.

In some embodiments, the method further includes incrementing a counter indicating a number of attempts to remove the clogging condition following execution of the remedial operation if the clogging condition has not been removed. Additionally, the method further includes ceasing operation of the dishwasher when the counter is greater than a threshold number.

According to one aspect, the method further includes determining at least one of the normal water level or the normal rate at which the water level changes by determining the normal rate at which the water level changes during the wash cycle. The method further includes monitoring at least one of the water level or the rate at which the water level changes by monitoring the rate at which the water level changes during the wash cycle. The clogging condition is indicated by the deviation of the monitored rate of water level change from the normal rate. Additionally, in some embodiments, the method further includes executing the remedial operation by determining the remedial operation based on a degree of difference between the monitored rate at which the water level changes and the normal rate at which the water level changes. In some embodiments, the method further includes monitoring the rate at which the water level changes by monitoring the rate at which the water level changes with at least one detection device positioned below the filter. In some embodiments, the method further includes monitoring the rate at which the water level changes by monitoring the rate at which the water level changes with at least one detection device positioned above the filter.

In some embodiments, the method includes determining at least one of the normal water level or the normal rate at which the water level changes by determining the normal water level during the wash cycle. The method includes monitoring at least one of the water level or the rate at which the water level changes by monitoring the water level during the wash cycle. The clogging condition is indicated by the deviation of the monitored water level from the normal water level.

In some embodiments, the method includes resuming operation of the dishwasher based at least on the current position if the clogging condition has been removed by resuming operation of the dishwasher at the current position.

Another embodiment of the present invention includes a dishwasher configured to detect and remove a clogging condition of a filter. The dishwasher comprises a control device in communication with the at least one detection device and configured to determine at least one of a normal water level for a wash cycle of the dishwasher or a normal rate at which the water level changes for the wash cycle. The control device is further configured to monitor at least one of a water level during execution of the wash cycle or a rate at which the water level changes during execution of the wash cycle. The control device is further configured to detect the clogging condition of the filter. The clogging condition is indicated by at least one of a deviation of the monitored water level from the normal water level or a deviation of the monitored rate at which the water level changes from the normal rate at which the water level changes. The control device is further configured to determine a current position of the wash cycle being executed. The control device is further configured to execute a remedial operation to facilitate removal of the clogging condition from the filter. The control device is further configured to determine if the clogging condition has been removed following execution of the remedial operation. The control device is further configured to resume operation of the dishwasher based at least on the current position in the wash cycle if the clogging condition has been removed.

According to one aspect, the control device is further configured to execute the remedial operation by determining the remedial operation based on a degree at which the filter is clogged. In some embodiments, the control device is further configured to execute the remedial operation by determining the remedial operation based on predefined rules.

In some embodiments, the control device is further configured to execute the remedial operation by selecting the remedial operation from a list of remedial operations. The list of remedial operations may define a hierarchy of remedial operations that each corresponds to a degree at which the filter is clogged. In some embodiments, the control device is further configured to execute a second remedial operation if the clogging condition has not been removed. The second remedial operation may be ranked higher in degree than the first remedial operation in the list of remedial operations.

In some embodiments, the control device is further configured to increment a counter indicating a number of attempts to remove the clogging condition following execution of the remedial operation if the clogging condition has not been removed. Additionally, the control device is further configured to cease operation of the dishwasher when the counter is greater than a threshold number.

In some embodiments, the control device is configured to determine the normal rate at which the water level changes and monitor the rate at which the water level changes. The clogging condition is indicated by the deviation of the monitored rate of water level change from the normal rate. In some embodiments, the control device is further configured to monitor the rate at which the water level changes by monitoring the rate at which the water level changes with at least one detection device positioned below the filter. In some embodiments, the control device is further configured to monitor the rate at which the water level changes by monitoring the rate at which the water level changes with at least one detection device positioned above the filter.

In some embodiments, the control device is configured to determine the normal water level and monitor the water level. The clogging condition is indicated by the deviation of the monitored water level from the normal water level. In some embodiments, the detection device comprises at least one pressure sensor.

In some embodiments, the control device is further configured to resume operation of the dishwasher based at least on the current position if the clogging condition has been removed by resuming operation of the dishwasher at the current position.

Other embodiments of the present invention include a computer program product for detecting and removing a clogging condition of a filter in a dishwasher. The computer program product comprises a non-transitory computer readable medium having program code portions stored thereon, the program code portions being a computer readable medium and configured when said program product is run on a control device, to perform the method comprising determining at least one of a normal water level for a wash cycle of the dishwasher or a normal rate at which the water level changes for the wash cycle. The method further includes monitoring at least one of a water level during execution of the wash cycle or a rate at which the water level changes during execution of the wash cycle. The method further includes detecting the clogging condition of the filter. The clogging condition is indicated by at least one of a deviation of the monitored water level from the normal water level or a deviation of the monitored rate at which the water level changes from the normal rate at which the water level changes. The method further includes determining a current position of the wash cycle being executed. The method further includes executing a remedial operation to facilitate removal of the clogging condition from the filter. The method also includes determining if the clogging condition has been removed following execution of the remedial operation. The method further includes resuming operation of the dishwasher based at least on the current position if the clogging condition has been removed.

BRIEF DESCRIPTION OF THE SEVERAL VIEWS OF THE DRAWINGS

Figure 1:
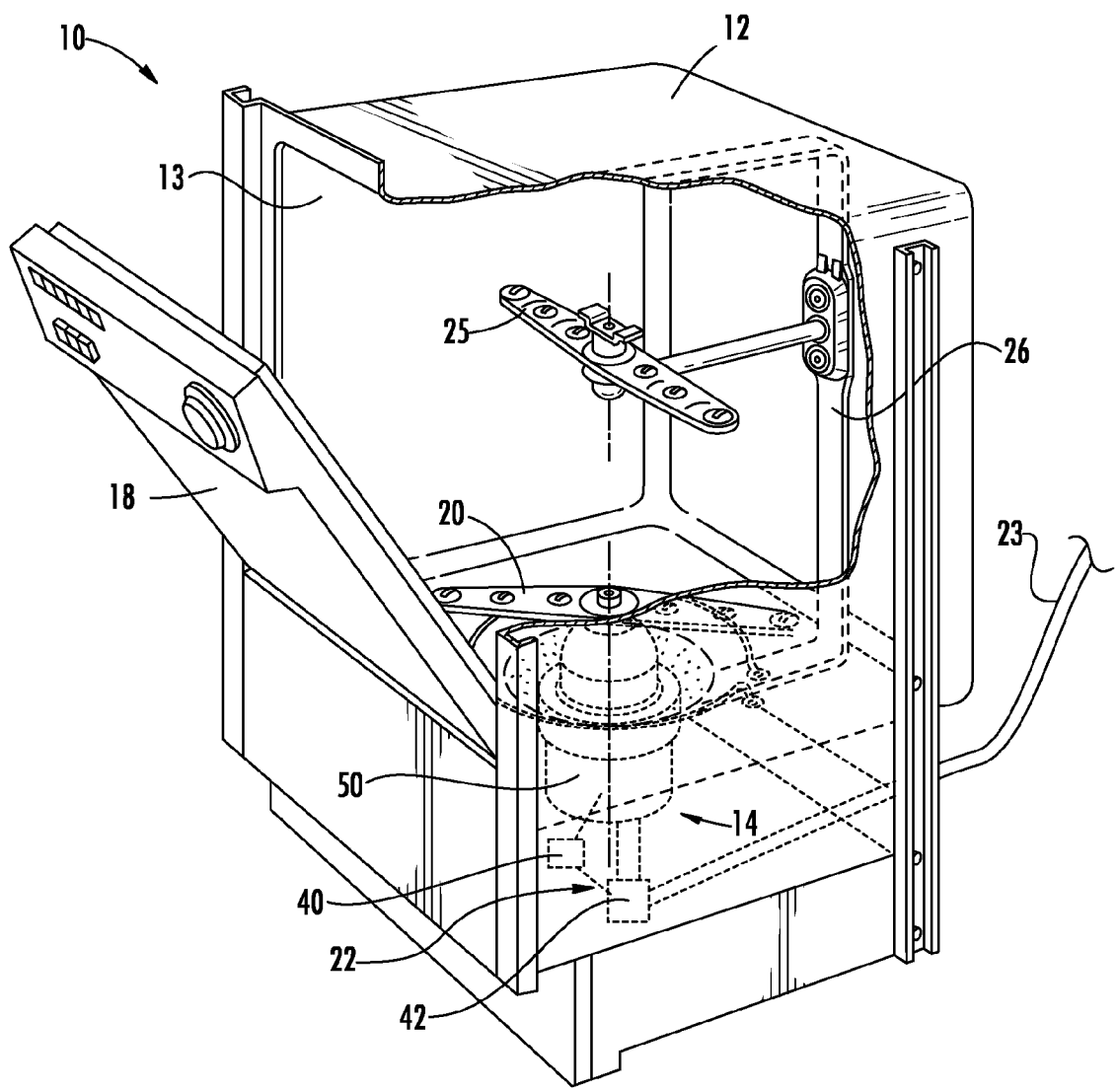
Figure 2:
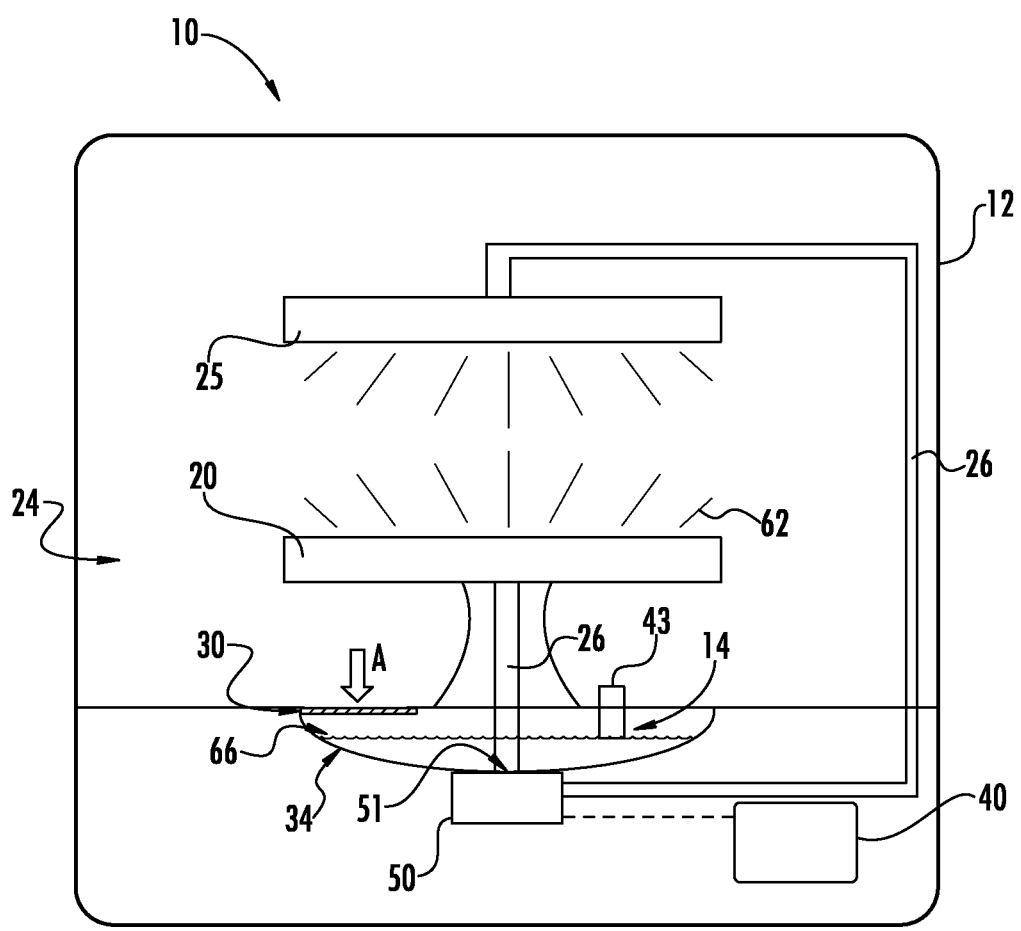
Figure 3:
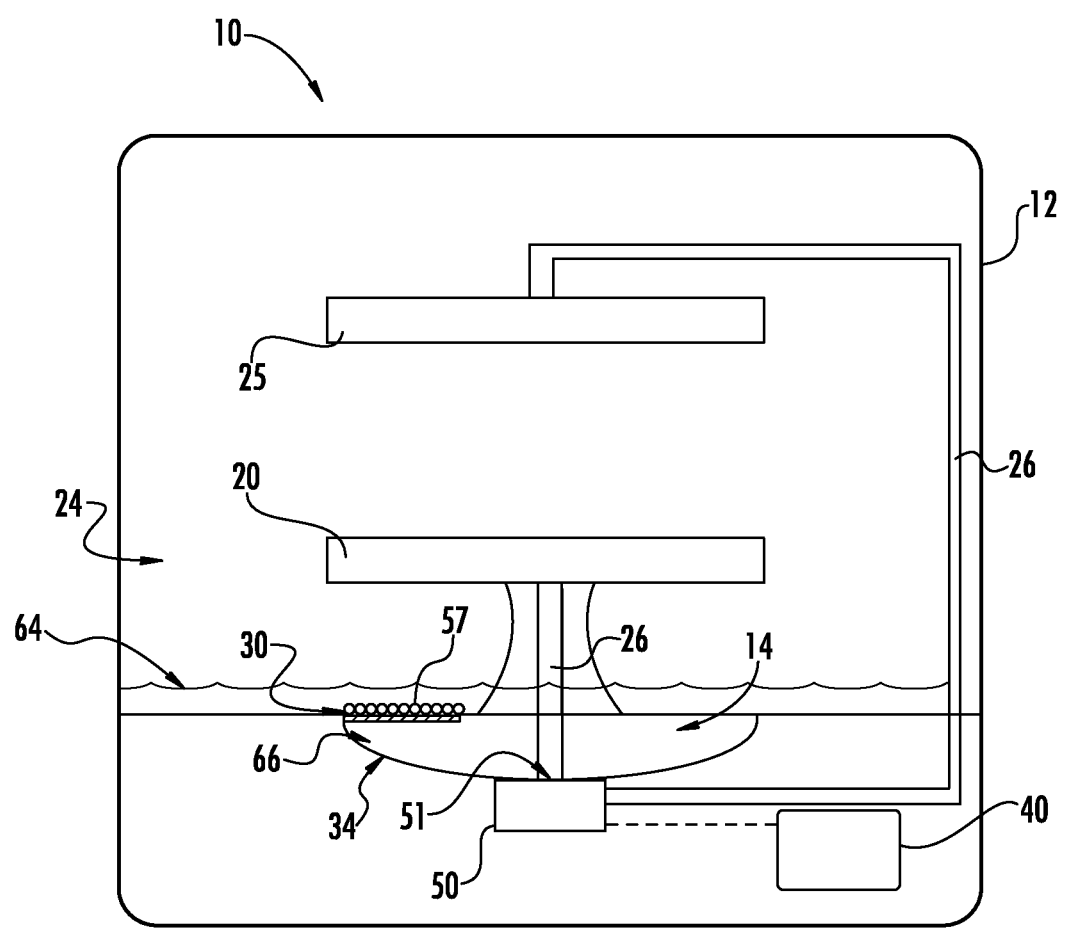
Figure 4:
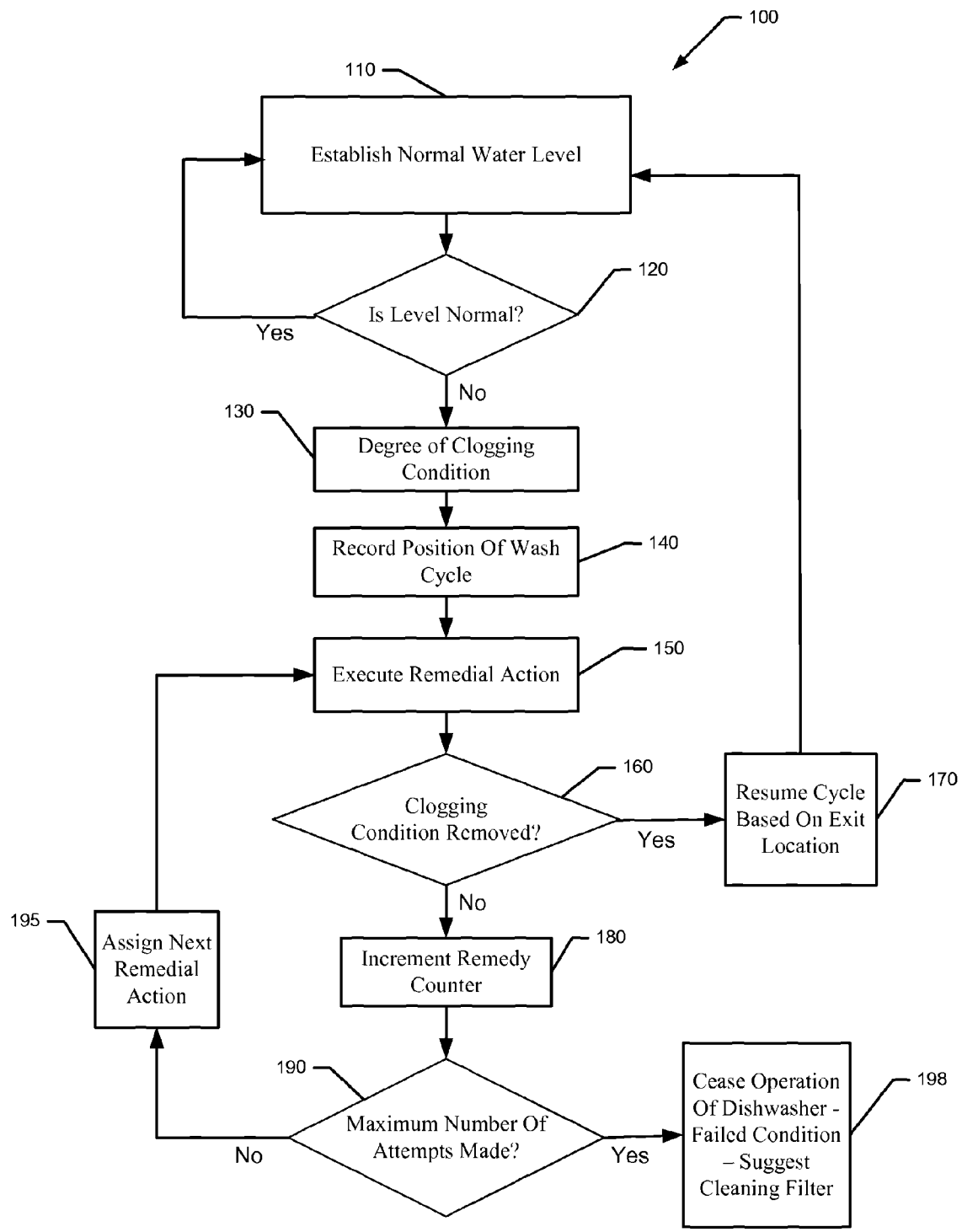
Figure 5A:
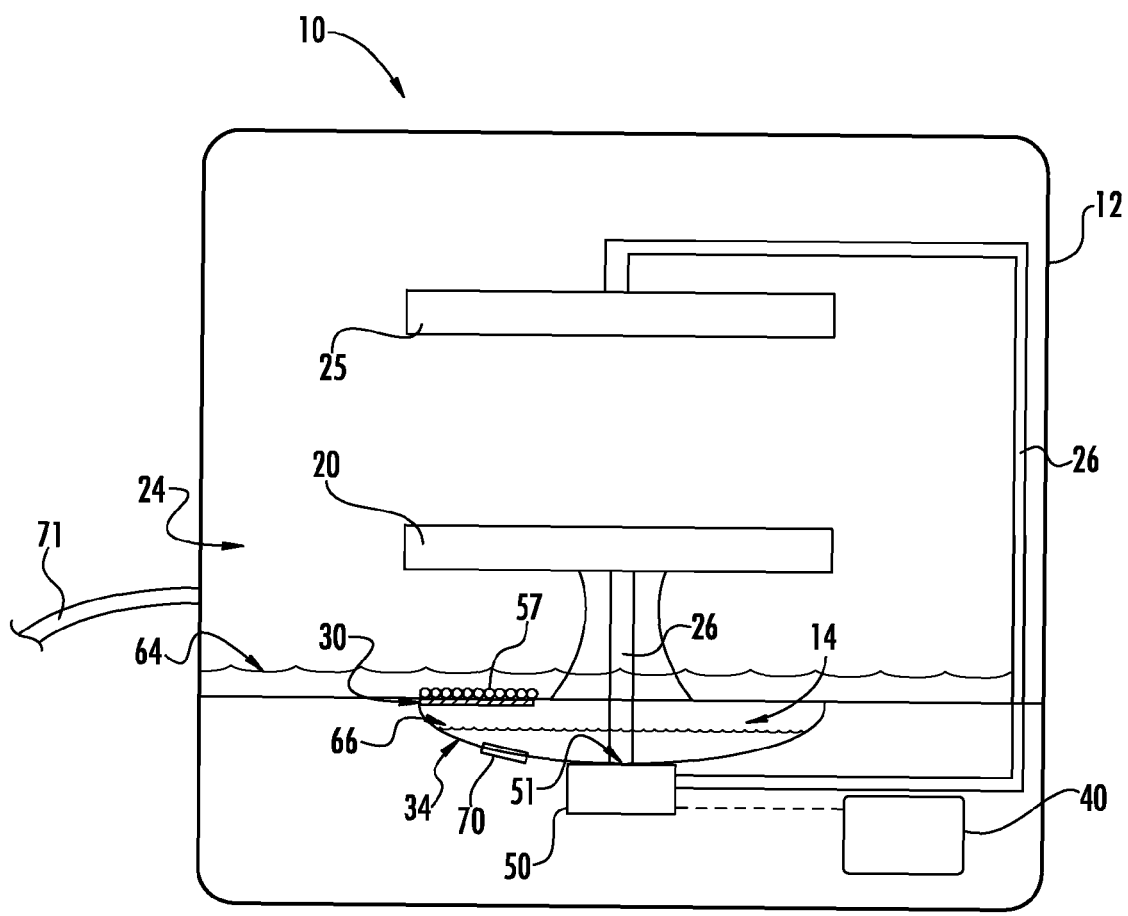
Figure 5B:
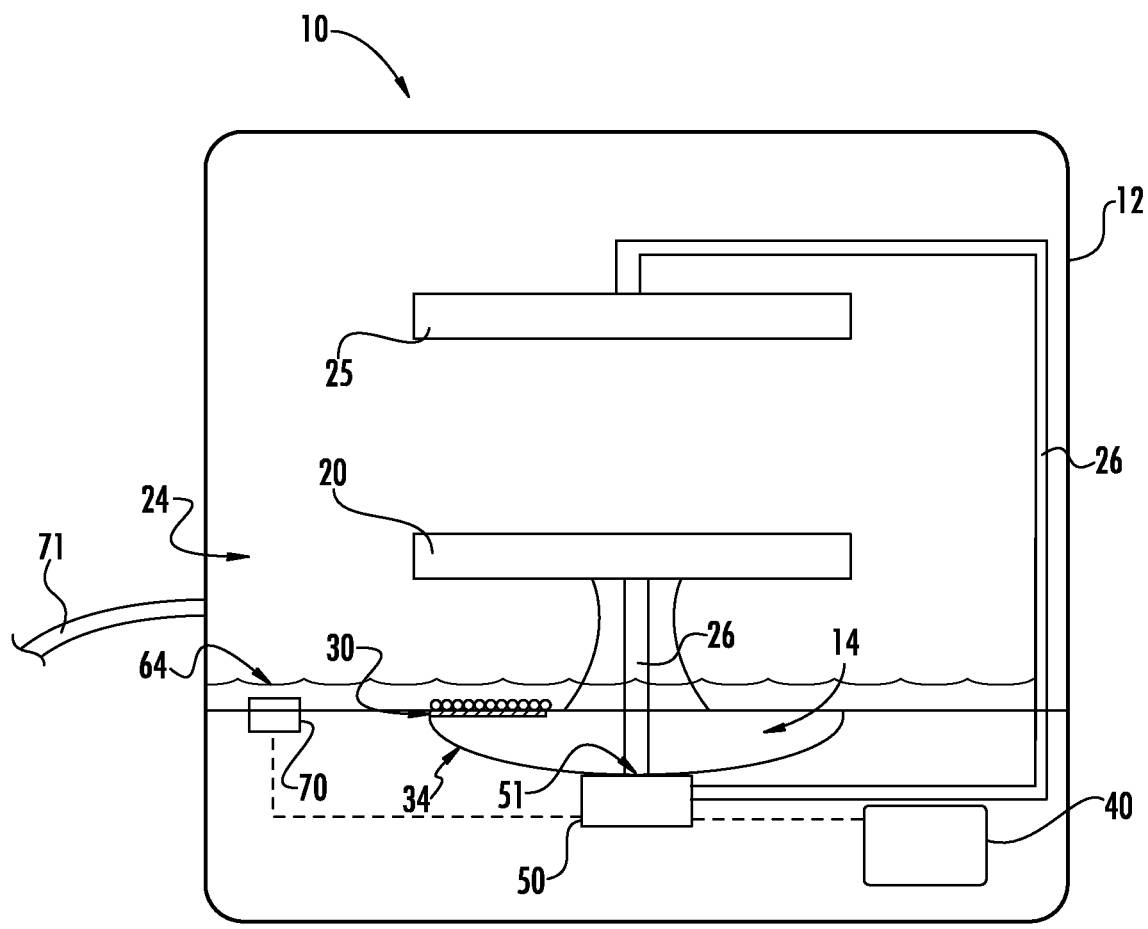
Figure 6A:
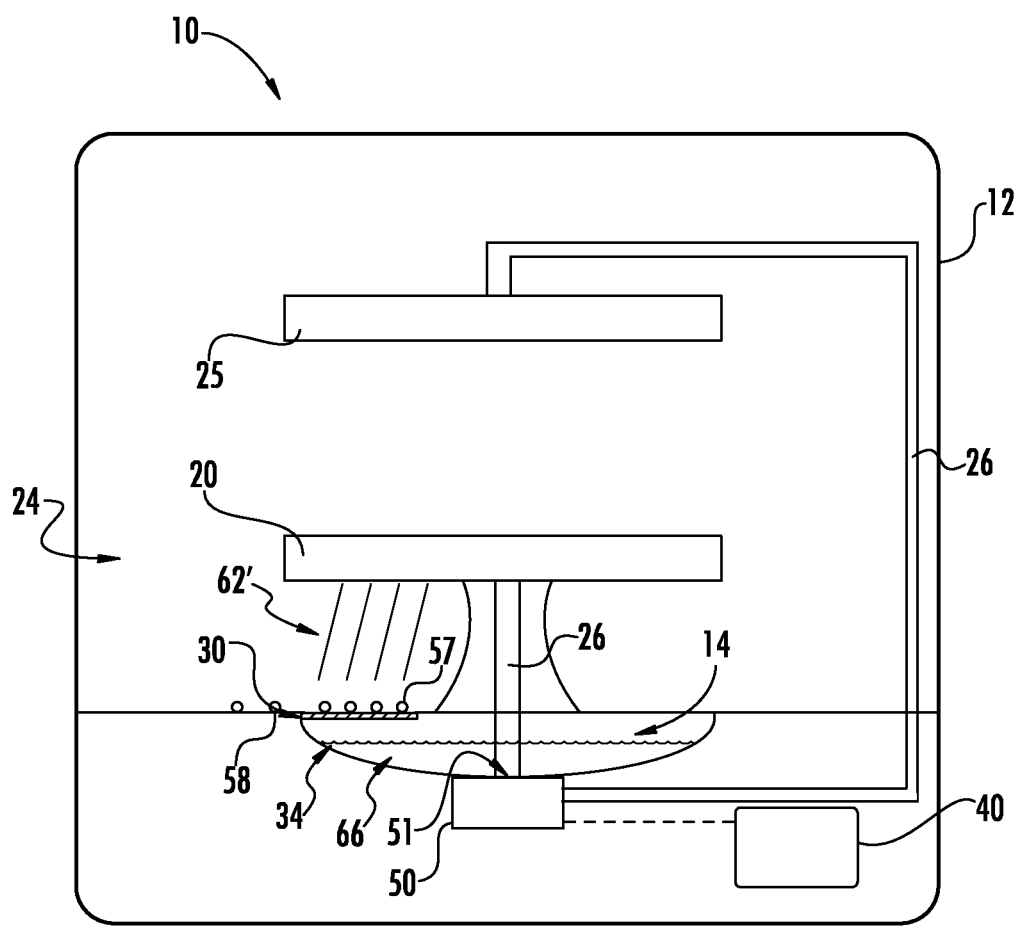
Figure 6B:
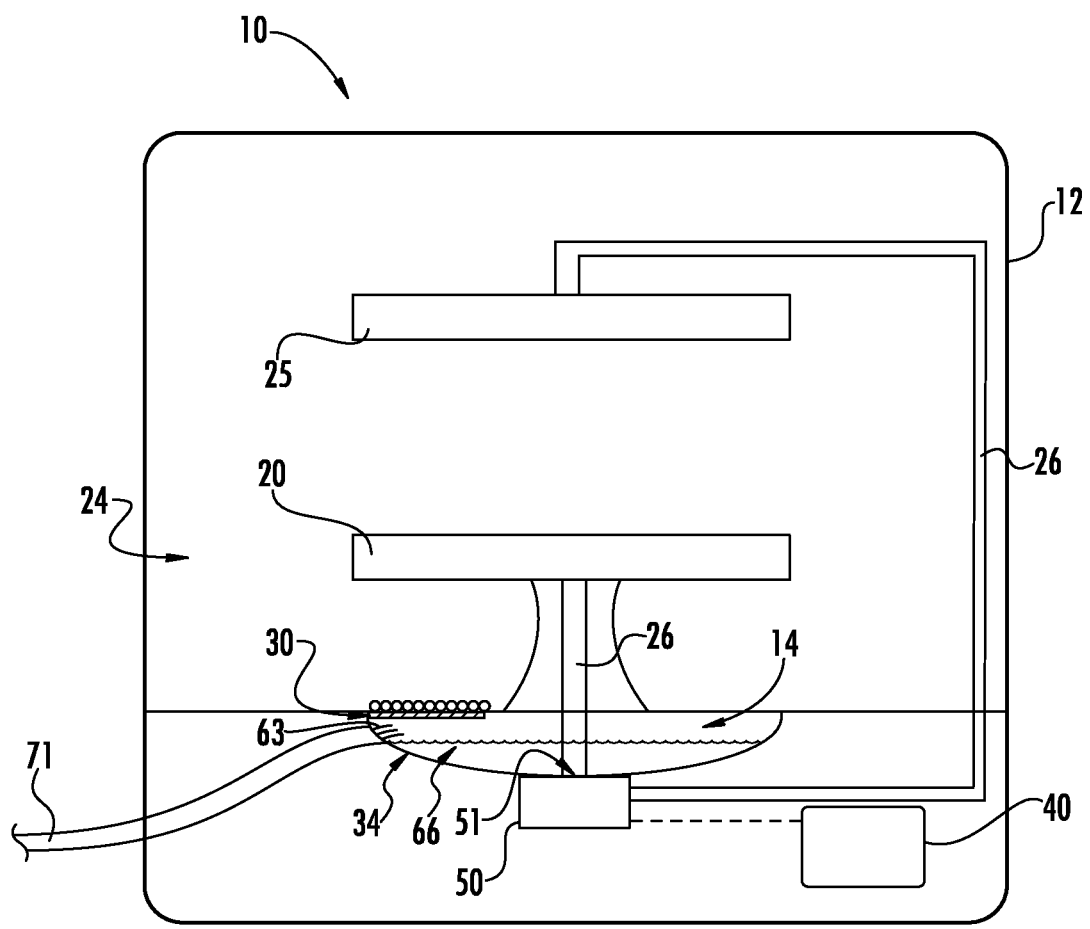
Figure 6C:
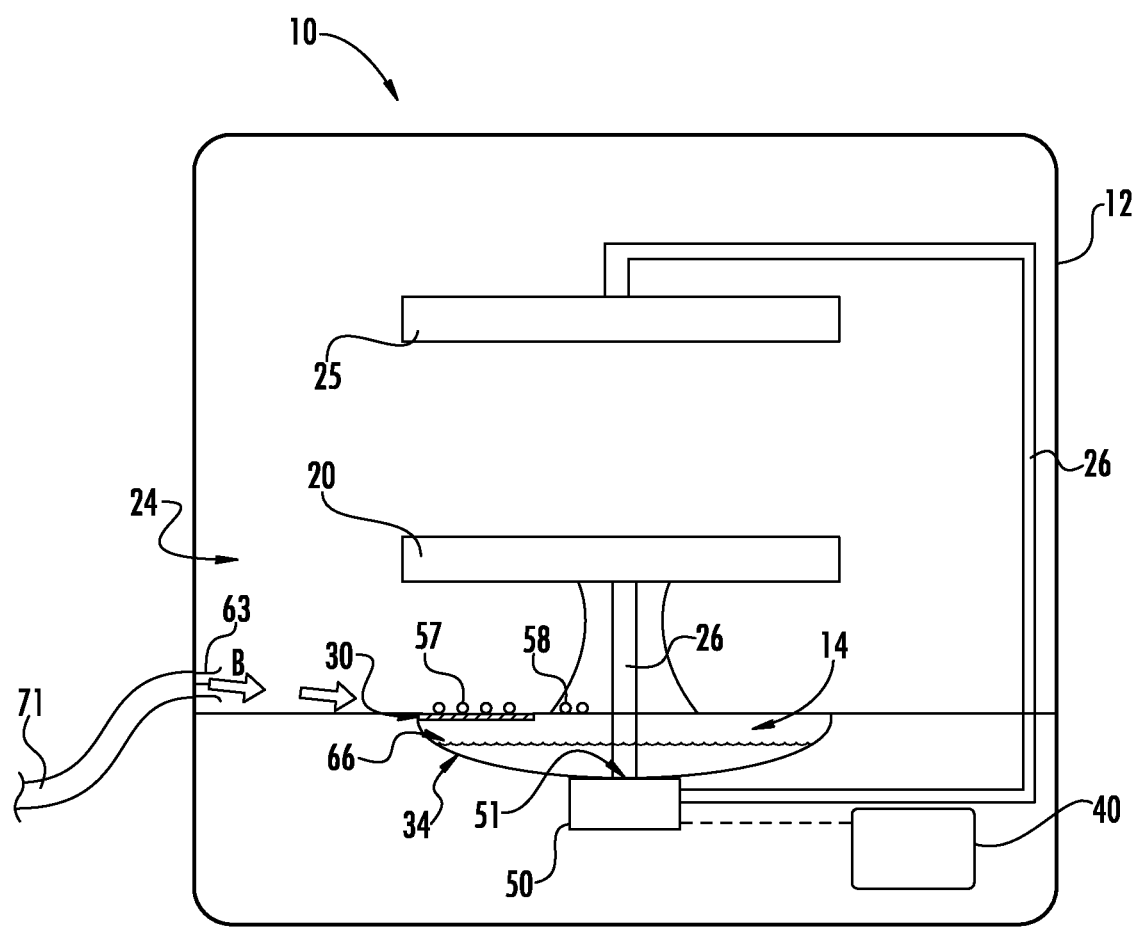
Figure 6D:
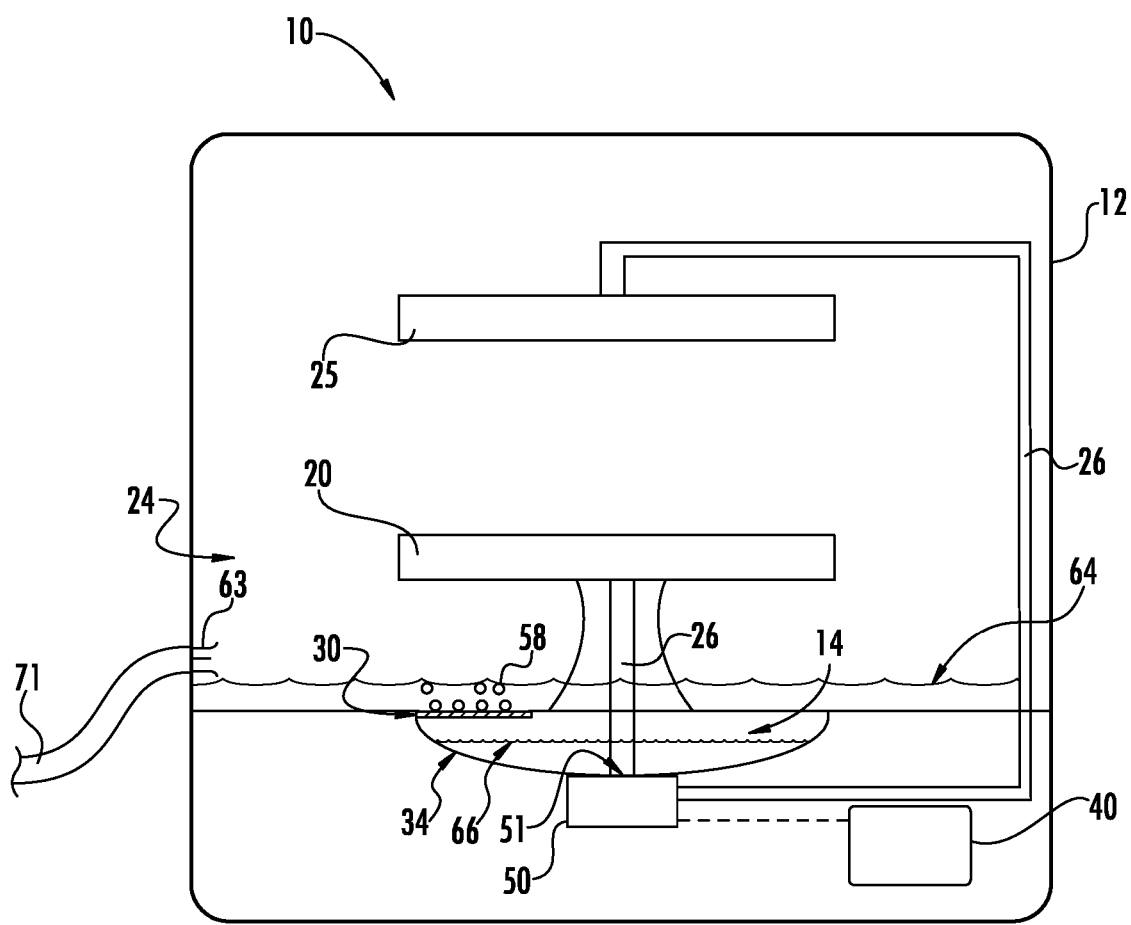
Figure 6E:
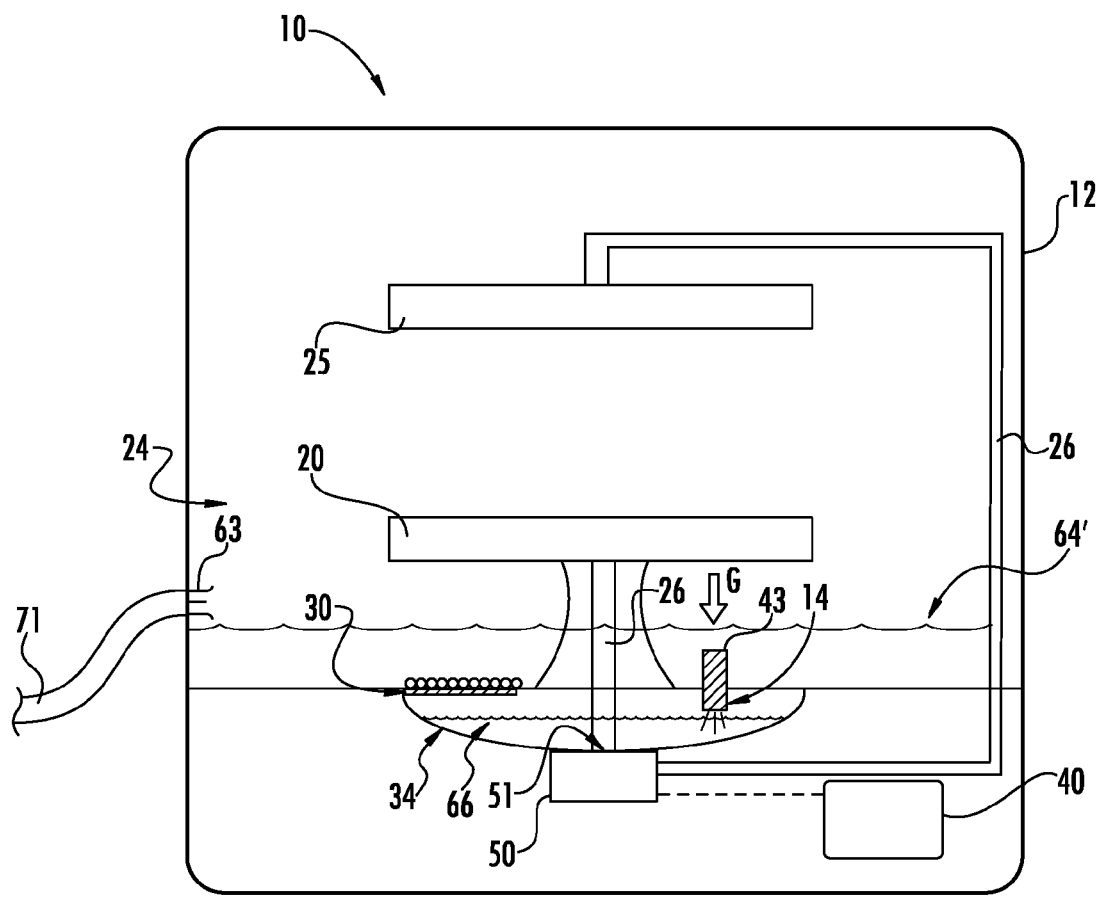
Figure 7:
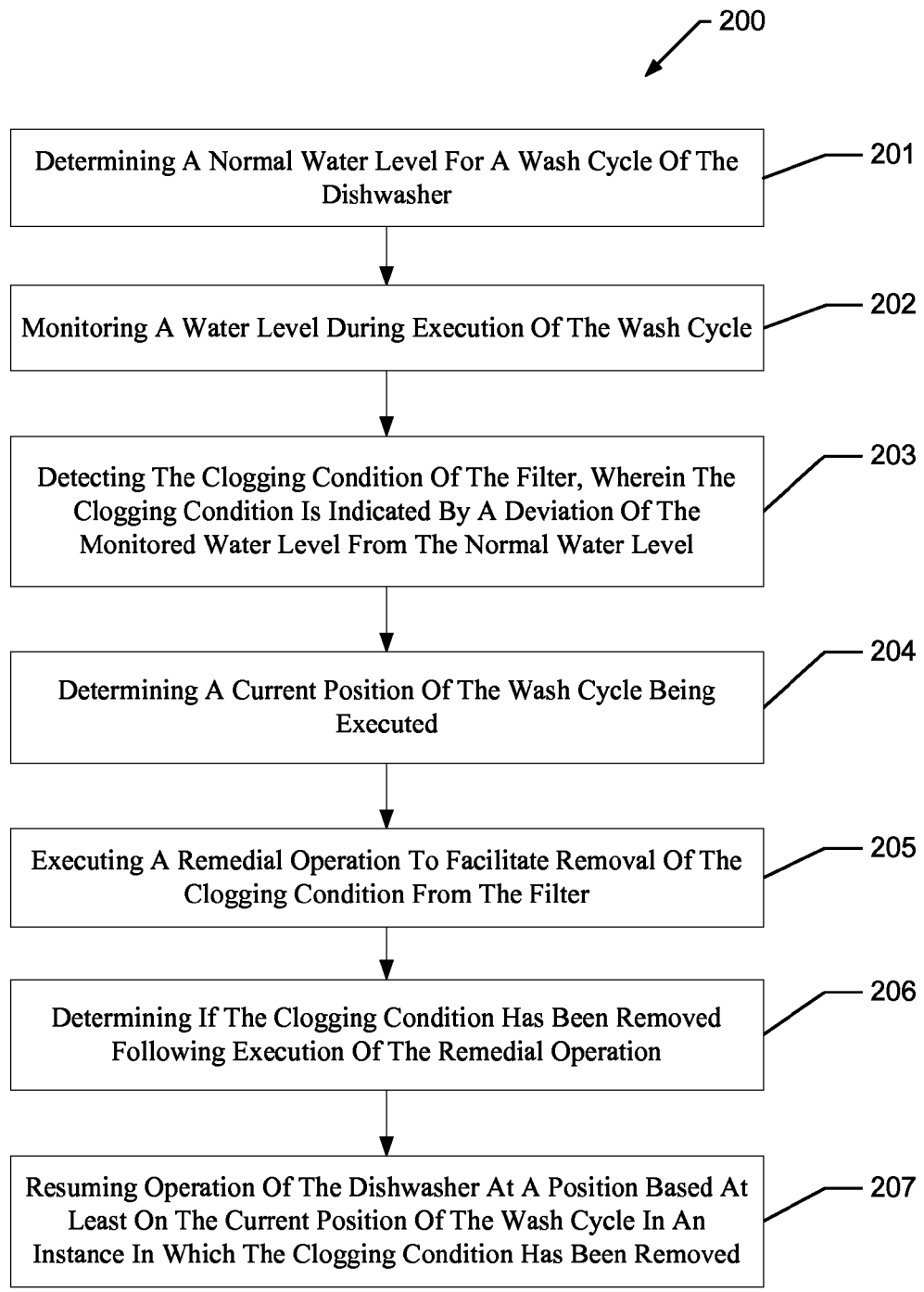
Figure 8:
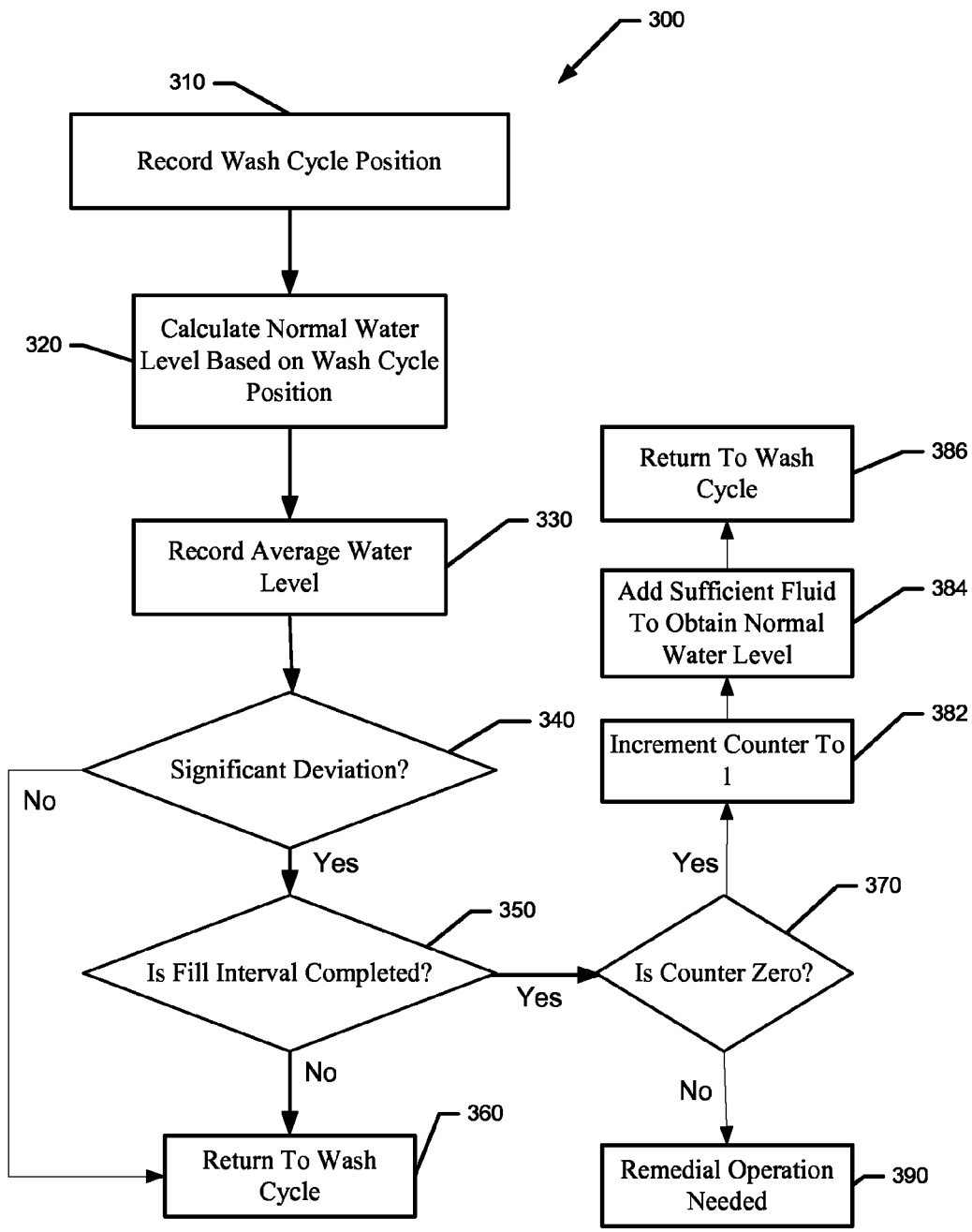

Having thus described the invention in general terms, reference will now be made to the accompanying drawings, which are not necessarily drawn to scale, and wherein:

FIG. 1 is a perspective view of a partially exposed dishwasher, in accordance with some embodiments discussed herein;

FIG. 2 is a cross-sectional front view of a dishwasher during a wash cycle, in accordance with some embodiments discussed herein;

FIG. 3 is a cross-sectional front view of a dishwasher, wherein a clogging condition of a filter has occurred in the dishwasher, in accordance with some embodiments discussed herein;

FIG. 4 is a flowchart that illustrates a method for detecting and removing a clogging condition of a filter in a dishwasher, in accordance with some embodiments discussed herein;

FIG. 5A is a cross-sectional front view of the dishwasher shown in FIG. 3, wherein a detection device is positioned below the filter, in accordance with some embodiments discussed herein;

FIG. 5B is a cross-sectional front view of the dishwasher shown in FIG. 3, wherein a detection device is positioned above the filter, in accordance with some embodiments discussed herein;

FIG. 6A is a cross-sectional front view of the dishwasher shown in FIG. 3 that illustrates a remedy for removing the clogging condition of the filter, wherein the circulation pump provides water through the lower spray arm or other dedicated spray jets to remove the clogging condition of the filter, in accordance with some embodiments discussed herein;

FIG. 6B is a cross-sectional front view of the dishwasher shown in FIG. 3 that illustrates another remedy for removing the clogging condition of the filter, wherein water is supplied directly to the circulation pump to remove the clogging condition of the filter, in accordance with some embodiments discussed herein;

FIG. 6C is a cross-sectional front view of the dishwasher shown in FIG. 3 that illustrates another remedy for removing the clogging condition of the filter, wherein water is directed at the filter to remove the clogging condition of the filter, in accordance with some embodiments discussed herein;

FIG. 6D is a cross-sectional front view of the dishwasher shown in FIG. 3 that illustrates another remedy for removing the clogging condition of the filter, wherein water is supplied to the tub to raise the water level to cause removal of the clogging condition of the filter, in accordance with some embodiments discussed herein;

FIG. 6E is a cross-sectional front view of the dishwasher shown in FIG. 3 that illustrates another remedy for removing the clogging condition of the filter, wherein water is supplied to the tub to raise the water level above an inlet of a chimney to enable water to flow to the volume below the filter, in accordance with some embodiments discussed herein;

FIG. 7 is a flowchart that illustrates another embodiment of a method for detecting and removing a clogging condition of a filter in a dishwasher, in accordance with some embodiments discussed herein; and FIG. 8 is a flowchart that illustrates an example embodiment of a method for detecting a clogging condition of a filter in a dishwasher and determining whether a remedial operation is needed, in accordance with some embodiments discussed herein.

DETAILED DESCRIPTION

Embodiments of the present invention now will be described more fully hereinafter with reference to the accompanying drawings, in which some, but not all embodiments of the invention are shown. Indeed, these embodiments may take many different forms and should not be construed as limited to the embodiments set forth herein; rather, these embodiments are provided so that this disclosure will satisfy applicable legal requirements. Like numbers refer to like elements throughout.

FIG. 1 illustrates one example of a dishwasher 10 capable of implementing various embodiments of the present invention. Such a dishwasher 10 typically includes a tub 12 (partly broken away in FIG. 1 to show internal details), having a plurality of walls (e.g., side wall 13) for forming an enclosure in which dishes, utensils, and other dishware may be placed for washing. As known in the art, the dishwasher 10 may also include slidable lower and upper racks (not shown) for holding the dishes, utensils, and dishware. A door 18 may be pivotably engaged with the tub 12 to selectively permit access to the interior of the tub 12. The door 18 closes to cover and seal the tub 12 when the dishwasher 10 is in operation.

The tub 12 may include a sump 14 in which wash water or rinse water is collected, typically under the influence of gravity. The wash/rinse water may be pumped by a circulation pump (such as through circulation conduit 26) to one or more spray arms (e.g., lower spray arm 20 and/or middle spray arm 25) mounted in the interior of the tub 12 for spraying the wash/rinse water, under pressure, onto the dishes, utensils, and other dishware contained therein.

The sump 14 and spray arms 20, 25 may be in fluid communication with various operational components of the dishwasher 10. For example, a water valve (not shown) and a drain pump 42 may each be in fluid communication with the sump 14 and spray arms 20, 25. The water valve may be configured to activate (e.g., open, turn ON, etc.) to direct water from a fluid supply/source (e.g., shown as fluid conduit 71 in FIG. 5A) to the tub 12 of the dishwasher 10. The water valve may also be configured to activate (e.g., close, turn OFF, etc.) to stop directing water to the tub 12. The drain pump 42 may be configured to activate (e.g., turn ON) to remove water from the sump 14 or tub 12. The drain pump 42 may also be configured to deactivate (e.g., turn OFF) to stop removing water from the sump 14 or tub 12. In some embodiments, water and soil collected in the sump 14 can be pumped out of the dishwasher 10 by the drain pump 42 through a drain hose 23. The drain hose 23 comprises a hose that extends from the drain pump 42, or otherwise from the dishwasher 10, to a typical home drain plumbing system and is configured to remove water and soils from the dishwasher 10 to the home drain plumbing. Thus, through selective activation of the water valve/drain pump, water may be selectively added or removed from the tub 12 of the dishwasher 10. The drain pump and the water valve may be configured to be automatically activated (i.e., electrically opened and closed), though one skilled in the art will appreciate that such components may be actuated in different ways such as, for example, mechanically, hydraulically, and/or in other appropriate manners.

In some embodiments, the particular operational components of the dishwasher (e.g., water valve, drain pump 42, corresponding hoses and wires, etc.) may be housed, disposed, or otherwise positioned within a base portion 22 positioned beneath the tub 12. In some instances, the base portion 22 may be a separate component with respect to the tub 12, such as, for example, a molded polymer component, while in other instances the base portion 22 may be integral with the tub 12 such that the side walls forming the tub 12 also at least partially form the base portion 22.

Operation of the dishwasher 10 typically includes execution of wash cycles having various parameters of the dishwashing process. In particular, the dishwasher 10 may be in an operating mode when undergoing these wash cycles. Moreover, each wash cycle may have different positions that correspond to current operations of the components of the dishwasher (e.g., activating/deactivating the drain pump, activating/deactivating the circulation pump, activating/deactivating the water valve, activating/deactivating a heating element, etc.).

Along these lines, a control device (e.g., the control device 40 shown in FIGS. 1, 2, and 3) can be used to communicate with certain components of the dishwasher 10. The control device 40 may be housed inside the base portion 22 of the tub 12 or other location so as to facilitate communication with various components of the dishwasher 10. In the depicted embodiment, the control device 40 is housed in the base portion 22 of the tub 12 and is configured to communicate with a circulation pump 50. Embodiments of the present invention contemplate communication of the control device with any of the components of the dishwasher (e.g., drain pump, water valve, etc.). In this way, the control device 40 can control activation/deactivation of any of the components of the dishwasher. As described in greater detail herein, the control device 40 may also be in communication with a detection device 70 (shown in FIGS. 5A and 5B) such that the control device 40 may be configured to detect occurrence of (including the onset of) a clogging condition. Furthermore, as also described in greater detail herein, the control device 40 may be configured to communicate with the dishwasher 10 to determine the current position of the wash cycle being executed by the dishwasher 10. Additionally, the control device 40 may be configured to control operation of the dishwasher 10 so as to cease operation of the wash cycle of the dishwasher. Likewise, the control device 40 may be configured to return operation of the dishwasher to the current position of the wash cycle or to a nearby position in the cycle if that is more reasonable. The control device 40 may be any type of device that can communicate with the components of the dishwasher 10 (e.g., electronically, mechanically, or otherwise). In the case of electronic communication, the control device 40 may include a memory for storing of programming, routines, and variables. In one embodiment, the control device 40 is a microprocessor or other processor configured to perform the functions described herein and may operate under the control of software. In such a regard, the control device 40 may be configured to execute any of the functions described herein according to various embodiments of the present invention.

In other embodiments, the control device 40 may be further configured to indicate or otherwise provide error message signals by either storing them in the control device 40 for later access by a user, signaling the dishwasher 10 to display the error message to the user, or other indicating means (e.g., audible or visual). Thus, the control device 40 may be configured to signal an overwhelming condition error in response to the detection device 70 detecting an overwhelming condition of the filter.

During a typical wash cycle, for example, with reference to FIG. 2, a dishwasher 10 may provide water through a circulation pump 50 to the spray arms 20, 25 to cause water to spray into the tub 12. The water 62 that is sprayed into the tub 12 falls (e.g., under the influence of gravity) to the sump 14 and interacts with a filter 30. The filter 30 separates the water from soils or other substances (such as may be removed from dishes and utensils). The water falls through the filter 30 (e.g., along arrow A) to a volume 34 below the filter 30 within the sump 14. A circulation pump 50, such as through the circulation pump inlet 51, causes water (e.g., shown by water level 66) from the volume 34 below the filter 30 to re-circulate back to the spray arms 20, 25 for continuation of the wash cycle.

Though the filter 30 is depicted in FIG. 2 as covering only a portion of the sump 14, some embodiments of the present invention contemplate any size or location of the filter. For example, in some embodiments, the filter may cover the majority of the sump 14. Along these lines, some embodiments of the present invention contemplate any type of filter (e.g., glass trap, soil filter, fine filter, etc.). Moreover, some embodiments of the present invention contemplate any type of orientation of the filter (e.g., horizontal, vertical, etc.). The filter 30, however, is generally located above the sump 14 for filtering particles from the water.

In some embodiments, one or more additional filters may be provided. In some cases, the additional filters may have different characteristics such that they facilitate filtering of different sized particles (e.g., a fine filter vs. a soil filter).

In some embodiments, the filter 30 may be located upstream of the circulation pump 50. In such a regard, the circulation pump 50 does not directly pump wash water into the filter 30 (e.g., the circulation pump 50 pumps water through a circulation conduit 26 and a spray arm 20, 25 before it interacts with the filter 30).

In some embodiments, a chimney 43 may be provided in sump 14. The chimney 43 may provide a fluid connection between the volume 24 above the filter 30 and the volume 34 below the filter 30. For example, the chimney 43 may provide a conduit that runs from an inlet located proximate the top of the chimney 43 (e.g., above the filter 30) to an outlet located proximate the bottom of the chimney 43 (e.g., below the filter 30), such as for preventing pressure imbalances between the volumes 24, 34. In such a regard, as will be described in greater detail herein, water may be provided to the volume 34 below the filter 30 through the inlet of the chimney 43. In some embodiments, the height of the inlet of the chimney 43 may be below an alarm level that indicates the occurrence of a flooding condition of the dishwasher. Additionally, in some embodiments, a chimney filter may be positioned over the inlet to prevent soils from falling into the volume 34 below the filter 30 through the chimney.

Sometimes, during the wash cycle, soils (or other particles) can become stuck on the filter causing a clogging condition that prevents or slows water from passing through the filter to the circulation pump. In such a situation, low water level below the filter causes the circulation pump to suck in air, which may make the circulation pump's discharge flow become intermittent or even to stop as the pump loses its prime. In some cases, the filter may be fully clogged (e.g., an overwhelming condition), such that no water can return to the volume 34 below the filter, and the pumping stops and the pump runs dry. These conditions may ultimately damage the circulation pump if not addressed quickly. For example, with reference to FIG. 3, particles 57 may build up on the filter 30, preventing water from passing through to the volume 34 below the filter 30. Instead, the water (as illustrated by the water level 64) may build up within the tub 12. In such a case, the circulation pump 50 has no or little water to circulate to the spray arms 20, 25 to continue the wash cycle.

Since damage to the circulation pump is unwanted and efficiency of the wash cycle is desired, some embodiments of the present invention seek to detect and remove a clogging condition of a filter.

In such a regard, in some embodiments, the dishwasher 10 may comprise at least one detection device 70 for monitoring the water level and indirectly or directly detecting a clogging condition of the filter 30. The detection device 70 may be any type of device that can detect a clogging condition of the filter (e.g., a pressure sensor) and can be located above or below the filter 30 to detect the respective water level. In such a regard, as will be described in greater detail herein, by monitoring the water level and/or rate of change of the water level either above or below the filter, the detection device 70 may be configured to detect the occurrence of a clogging condition. Likewise, the detection device 70 may be configured to detect removal of the clogging condition. Additionally, in some embodiments, the detection device 70 may be configured to detect the degree of the clogging condition or that an overwhelming condition is forming. Thus, a clogging condition may be indicative of the onset of filter clogging, partial filter clogging, or substantial/total filter clogging (i.e., an overwhelming condition). In such a situation, the detection device 70 may provide information for anticipating and/or identifying a clogging condition. For example, a lower degree of a clogging condition may occur when only a portion of the filter is clogged, whereas a higher degree of a clogging condition may occur when the entire filter is clogged.

Although some embodiments describe detecting a clogging condition with a detection device, other means of detection are contemplated. For example, in some embodiments, circulation pump parameters (e.g., current draw and speed) may be monitored to detect a clogging condition. Additionally, in some embodiments, a combination of detection means may be used to detect a clogging condition, such as by monitoring the pump parameters and the water level through a detection device.

Embodiments of the present invention seek to detect and remove a clogging condition of a filter in a dishwasher. FIG. 4 illustrates a flow chart of one embodiment of a method for detecting and removing a clogging condition of a filter in a dishwasher. The operations depicted in FIG. 4 may include any embodiments described herein. The operations illustrated in and described with respect to FIG. 4 may, for example, be performed by, with the assistance of, and/or under the control of one or more components of the dishwasher 10 (e.g., control device 40, detection device 70, drain pump 42, circulation pump 50, water valve, etc.).

In some embodiments, the method 100 (shown in FIG. 4) may comprise, at operation 110, establishing a "normal" or expected water level. In order to help detect the occurrence of a clogging condition, the detection device 70 may be configured to monitor a water level inside the tub 12 of the dishwasher 10. In particular, a clogging condition may be detected when the water level and/or rate of change of the water level deviates from an expected water level and/or rate of change of the water level at a particular time during the wash cycle. In some embodiments, the dishwasher 10 may be configured to determine a normal water level (e.g., the expected water level). However, this normal water level may vary depending on the current operation of the dishwasher. As such, establishment of a normal water level may be difficult as a dishwasher may execute a number of different cycles (or segments within a wash cycle) during operation and each cycle may require a different amount of water or may utilize different hardware that may affect the water level. Moreover, additional variations may be present based on the specific type of dishwasher. Furthermore, water may be present in the dishwasher, but unable to be detected by the water level sensor (e.g., running through the hoses connecting to the spray arms, caught in an overturned glass, etc.). These variations in the water level created by different cycles, hardware, or circumstances may need to be accounted for when determining the "normal" or expected water level of each cycle location of the dishwasher. Thus, the dishwasher 10 may be configured to determine a normal water level for a wash cycle of the dishwasher (e.g., the current wash cycle of the dishwasher).

As used herein, the term "wash cycle" is not meant to be limiting, as the wash cycle may be a variety of wash cycles and include one or more wash segments. For example, the wash cycle could be a normal wash cycle, a china/crystal wash cycle, an economy wash cycle, a speed wash cycle, an automatic wash cycle, or the like. In addition, wash segments may include, for instance, any portion of a wash cycle (e.g., pre-wash, main-wash, pre-rinse, final rinse, etc.), although the wash cycle may include a single wash segment in some embodiments. In one example, the wash segment is a portion of a wash cycle that minimally starts with a fill, includes some operation of the circulation pump, and ends with a drain.

As used herein, and as evidenced in the above description, the normal water level may account for a number of different variables. Along these lines, the normal water level may also account for fluctuations that may occur in the water level, such as due to water circulation through the components of the dishwasher (e.g., circulation pump 50, spray arms 20, 25, etc.). In this regard, the normal water level may include a range of water levels that are considered normal for the current wash cycle or for particular times during the wash cycle.

Similarly, in some embodiments, the dishwasher 10 may be configured to determine a normal rate at which the water level changes. In such a regard, while the water level may fluctuate through a wash cycle, a potential indicator of a clogging condition may be a significant change in the rate of water level change within a certain volume of the dishwasher. For example, a rapid drop in the rate of change of the water level (e.g., the water level remains stagnant) may indicate that water is not properly circulating through the dishwasher components. Along similar lines, a rapid increase in the rate of change of the water level in a situation or volume in which the water level should be dropping may indicate that a clogging condition has occurred or currently is occurring. Thus, the dishwasher 10 may be configured to determine a normal rate at which the water level changes for a wash cycle of the dishwasher (e.g., the current wash cycle of the dishwasher).

As used herein, and as evidenced in the above description, the normal rate at which the water level changes may account for a number of different variables. Along these lines, the normal rate at which the water level changes may also account for fluctuations that may occur in the rate at which the water level changes. In this regard, the normal rate at which the water level changes may include a range of rates at which the water level changes that are considered "normal" for the current wash cycle for particular times during the wash cycle.

In some embodiments, the method 100 (shown in FIG. 4) may comprise, at operation 120, determining if the water level has deviated from the normal water level. In some embodiments, the dishwasher 10 may be configured to monitor a water level during execution of the wash cycle. Similarly, in some embodiments, the dishwasher 10 may be configured to monitor the rate at which the water level changes during execution of the wash cycle.

As such, in some embodiments, the dishwasher 10 may be configured to detect a clogging condition of a filter 30. In particular, by monitoring the water level, the dishwasher 10 may be configured to compare the monitored water level to the normal water level to determine if a deviation has occurred. In some embodiments, the clogging condition is indicated by a deviation of the monitored water level from the normal water level. In one embodiment, the detection device 70 may be configured to detect the water level and cooperate with the control device 40 to determine if a clogging condition has occurred.

In some embodiments, the method 100 (shown in FIG. 4) may comprise, at operation 130, detecting a degree of the clogging condition of the filter. In such an embodiment, the dishwasher 10 may be configured to determine the "degree" of the clogging condition. For example, the degree of deviation between the monitored water level and the normal water level may indicate the degree of the clogging condition. Moreover, in embodiments where the dishwasher 10 is configured to determine a degree of the clogging condition, the degree of deviation between the monitored rate at which the water level changes and the normal rate at which the water level changes may indicate the "degree" of the clogging condition. As used herein, the "degree" of the clogging condition may correspond to the severity of the clogging condition. For example, the degree of the clogging condition may be indicative of the severity of clogging of the filter (e.g., the amount of soil on the filter). Thus, a low degree of a clogging condition may allow some water to pass through the filter, whereas a high degree of a clogging condition may allow no water or almost no water to pass through the filter (i.e., an overwhelming condition).

Along these same lines, and using similar logic, the dishwasher 10 may be configured to anticipate the occurrence of an overwhelming condition, such that, as described in greater detail herein, a remedy can be applied before the overwhelming condition actually occurs.

The detection device 70 may be placed at various positions in the dishwasher 10 to monitor the water level for detection of the clogging condition of the filter 30. In particular, in some embodiments, with reference to FIG. 5A, the detection device 70 may be placed adjacent to the sump 14 such that it may monitor the water level and/or rate of water level change within the volume 34 below the filter 30. In such a location, the detection device 70 may monitor the water level 66 of the water immediately before entrance into the circulation pump 50. In some embodiments, depending on the determined normal water level, a drop in the water level 66 may indicate a clogging condition has occurred, as water may be hindered from passing through the filter 30.

In some embodiments, with reference to FIG. 5B, the detection device 70 may be placed adjacent to the bottom of the tub 12 such that it may monitor the water level and/or rate of water level change within the volume 24 above the filter 30. In such a location, the detection device 70 may monitor the water level 64 of the water above the filter 30. In some embodiments, depending on the determined normal water level, an increase in the water level 64 may indicate a clogging condition has occurred, as water may not be able to pass through the filter 30 and, thus, is accumulating above the filter 30.

In some embodiments, the method 100 (shown in FIG. 4) may comprise, at operation 140, recording the current position of the wash cycle. Once a clogging condition has been identified, the dishwasher 10 may be configured to determine a current position of the wash cycle being executed. Additionally, the control device 40 may be configured to store the current position of the wash cycle, such as in a memory. As noted above, different positions of the wash cycle may require certain parameters, such as a specific amount, temperature, and/or saturation level of water present in the dishwasher. As described in greater detail herein, recording the last wash cycle position enables the control device 40 to return the dishwasher 10 to the parameters required for continuation at or near the recorded cycle position. Indeed, recording the wash cycle position of operation of the dishwasher can be beneficial for efficiently returning operation of the dishwasher to the proper configuration for resuming and completing the wash cycle. As noted herein, the "position" of the operation of the dishwasher may be at any point during the wash cycle (or wash segment). The position may be any point between the start and stop of a particular wash cycle (or wash segment).

In some embodiments, the method 100 (shown in FIG. 4) may comprise, at operation 150, executing a remedial operation. As noted above, some embodiments of the present invention attempt to detect and remove a clogging condition of a filter. Along these lines, some embodiments of the present invention attempt to prevent a full overwhelming condition of a filter through early detection and removal of a clogging condition. As such, the dishwasher 10 may be configured to execute a remedial operation to facilitate removal of the clogging condition from the filter 30. In particular, the dishwasher 10 may be configured to execute any of a number of different remedial operations that may depend on the type of components available, the current position of the wash cycle, the degree of the clogging condition, or any number and combination of factors.

Some exemplary remedial operations are illustrated in FIGS. 6A, 6B, 6C, 6D, and 6E. FIG. 6A illustrates a remedial operation that includes dedicated operation of the lower spray arm 20 in an effort to sweep soils off the filter 30. As noted herein, some embodiments of the present invention seek to recognize and, in some cases, anticipate an overwhelming condition of the filter. In some situations, water may be left within the volume 34 below the filter 30, such that the circulation pump 50 may continue to operate. However, the water supply may be minimal and, sometimes, less than normal operation. As such, the circulation pump 50 may only have enough water to operate (e.g., be primed) for a limited duration. Along these same lines, water may be seeping through the filter at a reduced rate due to the clogging condition, which may increase the time for a sufficient amount of water to accumulate for the circulation pump to operate properly.

In some embodiments, the dishwasher 10 may comprise a lower spray arm 20 or other spray mechanism that is configured to direct water toward the filter 30. In such a manner, the water may help sweep soils off of the filter 30 to prevent, or facilitate removal of, a clogging condition. Thus, one possible remedial operation for removal of a clogging condition may be to provide water to the lower spray arm 20 to be directed at the filter 30 to sweep away the soils on the filter 30. Supplying fluid to a lower arm without jets directed toward filter 30 may also accomplish the same result provided the water is directed back to the filter with sufficient velocity. However, as noted above, there may be a limited supply of water for the circulation pump 50. As such, in some embodiments, the dishwasher 10 may configured to execute a remedial operation that includes pulsing the circulation pump 50 to provide water to the lower spray arm 20. In particular, the pulses, in some embodiments, may be configured to match the amount of water available for the circulation pump 50 while pauses between pump pulses may be configured to allow an extended period for water to seep through the clogged or clogging filter 30 back to the pump. An additional advantage to operating the lower spray arm 20 is that the distance the water is circulated is reduced because the distance from the circulation pump to the lower spray arm is less than other spray arms (e.g., the middle or upper spray arm 25) and so less volume is needed to be filled before spraying occurs. Moreover, in some embodiments, the dishwasher 10 may be configured to not provide water to other spray arms so that the water is conserved for operation of the lower spray arm 20 only.

For example, with reference to FIG. 6A, there may be a limited amount of water 66 in the volume 34 below the filter 30. The circulation pump 50 may be operated (or, in some cases, pulsed) to provide water through the circulation conduit 26 to the lower spray arm 20. The water 62' may spray directly onto the filter 30 to sweep away the soils 57 on the filter 30 (e.g., some soils 58 have been removed from the filter 30). In such a manner, the clogging condition may be removed and water may now pass through the filter 30 to prime the circulation pump 50 for continuation of the wash cycle.

FIG. 6B illustrates another remedial operation that may be employed for a dishwasher that provides water directly to the volume below the filter. In the depicted embodiment, the remedial operation may include activating the water valve to provide water 63, such as through the hose 71 or other water inlet, to the volume 34 below the filter 30. In such a manner, water 66 may be available for operation of the circulation pump 50. Along these lines, in some embodiments, as illustrated in FIG. 6A, the circulation pump 50 may provide water to the lower spray arm 20 such that water 62' may spray directly onto the filter 30 to sweep away the soils 57 on the filter 30 (e.g., some soils 58 have been removed from the filter 30), thereby removing the clogging condition.

FIG. 6C illustrates another remedial operation that may be employed for a dishwasher that provides water to the volume of the dishwasher above the filter. In the depicted embodiment, the remedial operation may include activating the water valve to provide water 63, such as through the hose 71, to the volume 24 above the filter 30. The water 63, in some cases, may be directed toward the filter 30 (e.g., along arrow B) to sweep away the soils 57 on the filter 30 (e.g., some soils 58 have been removed from the filter 30), thereby removing the clogging condition.

FIG. 6D illustrates another remedial operation that may be employed for a dishwasher that provides water to the volume of the dishwasher above the filter. In the depicted embodiment, the remedial operation may include activating the water valve to provide water 63, such as through the hose 71 or other water inlet, to the volume 24 within the tub 12 above the filter 30. The water level 64 may rise and cause soils with a specific gravity less than 1 (e.g., soils 58) to rise off the filter 30, thereby removing a portion of the clogging condition. In such a situation, some soils 58 may be light enough to float on the surface of the water, thereby lifting off the filter 30 to allow some water to pass through the filter 30. In such a manner, water 66 may be available for operation of the circulation pump 50. Along these lines, in some embodiments, as illustrated in FIG. 6A, the circulation pump 50 may provide water to the lower spray arm 20 such that water 62' may spray directly onto the filter 30 to sweep away the soils 57 on the filter 30 (e.g., some soils 58 have been removed from the filter 30), thereby removing the clogging condition.

FIG. 6E illustrates another remedial operation that may be employed for a dishwasher that provides water to the volume of the dishwasher above the filter and includes a chimney. In the depicted embodiment, the remedial operation may include activating the water valve to provide water 63, such as through the hose 71 or other water inlet, to the volume 24 within the tub 12 above the filter 30. The water level 64' may rise above an inlet for a chimney 43 that provides a fluid connection between the tub 12 and the volume 34 below the filter 30. In such a manner, water may pass through the chimney 43 (e.g., along arrow G) and into the volume 34 below the filter 30. Thus, water 66 may be available for operation of the circulation pump 50. Along these lines, in some embodiments, as illustrated in FIG. 6A, the circulation pump 50 may provide water to the lower spray arm 20 such that water 62' may spray directly onto the filter 30 to sweep away the soils 57 on the filter 30 (e.g., some soils 58 have been removed from the filter 30), thereby removing the clogging condition.

Though the above described remedies are individually listed, some embodiments may provide a dishwasher 10 including a control device 40 configured to execute any number or combination of remedial operations. For example, in some embodiments, the dishwasher 10 may be configured to execute at least one of the following remedial operations: adding water above the filter, adding water below the filter, operating a circulation pump at a reduced speed, or pulsing operation of the circulation pump.

The above examples are given for explanatory purposes and, thus, embodiments of the present invention are not meant to be limited to the described remedies, as there may be many types of remedial operations that may be employed by embodiments of the present invention. Along these lines, other remedial operations may include: slowing the speed of operation of the circulation pump to lower the water output rate; pausing the circulation pump to allow time for water to return for use in removing the soils on the filter; and activating the drain pump to remove the dislodged soils from the dishwasher. A specific example of a remedy that includes activation, pausing, and deactivation of a number of components of the dishwasher (e.g., water valve, drain pump, and circulation pump) is provided in the following sequence:

- 10 second Fill of Water
- 5 second Pause of the Circulation Pump, the Drain Pump, and the Water Valve
- 5 second Operation of the Circulation Pump, the Drain Pump, and the Water Valve
- 20 second Fill of Water and Activation of the Drain Pump
- 10 second Fill of Water
- 20 second Fill of Water, Activation of the Circulation Pump, and Activation of the Drain Pump
- 40 second Activation of the Drain Pump
- Fill of Water to the "Normal" Water Level
- Activation of the Circulation Pump There are many degrees of a clogging condition and, thus, there are many types of remedial operations available that may correspond to the appropriate severity level of the clogging condition. As such, some embodiments of the present invention may determine what remedy to attempt based upon how severe of a deviation is sensed in the water level. In particular, in some embodiments, the dishwasher 10 may be configured to determine the remedial operation to execute based on a degree at which the filter is clogged. Along these lines, in some embodiments, the dishwasher 10 may be configured to determine the remedial operation to execute based on the degree of difference between the monitored water level and the normal water level. Likewise, in some embodiments, the dishwasher 10 may be configured to determine the remedial operation to execute based on the degree of difference between the monitored rate at which the water level changes and the normal rate at which the water level changes.

In some embodiments, the dishwasher 10 may be configured to determine the remedial operation to execute by selecting the remedial operation from a list of remedial operations. In some cases, the list of remedial operations may define a hierarchy of remedial operations that each operation corresponds to a degree at which the filter is clogged. In such a regard, the dishwasher 10 may be configured to select the remedial operation to execute based on the determined severity of the clogging condition, which may be represented by the degree at which the filter is clogged. In other embodiments, the dishwasher 10 may be configured to begin with execution of the first remedial operation on the list of remedial operations, which in some cases, may correspond to the least severe remedial operation. The dishwasher 10 could then proceed in order through a list of remedial operations in order of degree, with the last remedial operation configured to facilitate removal of the highest degree (e.g., most severe) of clogging condition.

In some embodiments, the dishwasher 10 may be configured to determine the remedial operation to execute based on a set of predefined rules. For example, such rules may be based on current operating conditions of the dishwasher, or its components (e.g., the circulation pump parameters). Additionally, in some cases, the set of predefined rules may take into account the determined degree of clogging of the filter. Along these same lines, the predefined rules may be any set of rules that allows the dishwasher 10 to determine what remedial operation to execute for removal of the clogging condition.

An example embodiment of predefined rules for determining the remedial operation is described below. However, embodiments of the present invention are not meant to be limited to the below described example, as other predefined rules are contemplated.

In some embodiments, the degree of deviation of the water level from the normal water level may be assigned a value (e.g., L1, L2, or L3). For example, L1 equates to a deviation of a water level that is slightly low. In such a situation, the circulation pump may occasionally draw in air due to a low water level at the circulation pump inlet. L2 may equate to a deviation of a water level that is low enough so that the circulation pump will periodically and repeatedly surge and then starve. L3 may equate to a deviation of a water level that is a very low level, thereby indicating that flow returning to the circulation pump is very low or, in some cases, nonexistent (e.g., the filter is completely overwhelmed).

Additionally, three possible remedial operations may be assigned a remedial operation value (e.g., RA1, RA2, or RA3). For example, RA1 may indicate a remedial operation that includes adding about ⅛ of the volume first applied for the wash segment while beginning to direct spray jets to sweep soils off the filter into the drain, continuing to sweep soils for a short time, then draining a small amount of fluid, and, finally, adding back fluid as needed to restore the water level to the normal water level.

RA2 may indicate a remedial operation that includes adding about ¼ of the volume first applied for the wash segment while beginning to direct spray jets to sweep soils off the filter into the drain, continuing to sweep soils for a short time, conducting a complete draining of the unit, and restoring the fluid level to that applied at the beginning of the wash segment.

RA3 may indicate a remedial operation that includes adding about ½ of the volume first applied for the wash segment, pausing the circulation pump for about 1 minute to allow the water to seep through, pulsing the circulation pump (e.g., 1 second on, 20 seconds off) for about 1 minute while directing its effluent to spray jets for sweeping soils off the filter into the drain. Then, RA3 may include conducting a complete drain (e.g., removing all fluid from the dishwasher tub) and restoring the fluid level to that applied at the beginning of the wash segment.

Additionally, three possible return positions may be assigned a return position value (e.g., R1, R2, or R3). For example, R1 may indicate to resume the wash cycle at the point where it was interrupted. R2 may indicate to resume the wash cycle at the start of the current wash segment. R3 may indicate to resume the wash cycle from the beginning of the wash cycle.

Based on the above described examples, in some embodiments, the predefined rules can be created to determine the appropriate remedial operation to perform. For example, a deviation of L1 may be addressed with remedial action RA1; a deviation of L2 may be addressed with remedial action RA2; and a deviation of L3 may be addressed with remedial action RA3.

In some embodiments, upon completion of a remedial operation, a counter may be incremented. Then the circulation pump may be operated at a fixed speed while the water level is monitored.

If the water level is still below the normal water level (or significantly deviated therefrom), whether improved or worsened, then the next (e.g., more robust) level of remedial operation may be applied. For example, if the previous remedial operation applied was RA3 and it did not clear the clogging condition, then RA3 may be applied at least a second time. If after applying RA3 twice or some predetermined number in a wash segment, the water level is still below the normal level then the wash cycle may end and the need for the clogged filter to receive maintenance may be indicated.

In some embodiments, if after performing the remedial operation a test of the level shows that the water level deviation is within expected limits, then the wash cycle may resume according to the following rules:

1) If the water level deviation was categorized as L3 or if RA3 was invoked as part of the level restoration then:
    a. For washes (pre-wash or main wash segments) return to the cycle per R2.
    b. For rinses (pre-rinse or final rinse segments) return to the cycle per R3.

2) If the highest level of deviation was categorized as L2 and/or if RA2 was necessary then:
    a. For washes (pre-wash or main wash segments) follow R2.
    b. For rinses (pre-rinse or final rinse segments) follow R2.
3) If the highest level of deviation was categorized as L1 and/or if only RA1 was necessary in order to restore the level to its expected height then:
    a. For washes (pre-wash or main wash segments) follow R1.
    b. For rinses (pre-rinse or final rinse segments) follow R1.

In some embodiments, the method 100 (shown in FIG. 4) may comprise, at operation 160, determining if the clogging condition has been removed. For example, in some embodiments, the dishwasher 10 may be configured to determine if the clogging condition has been removed following execution of the remedial operation. In particular, depending on the type of remedial operation used and the severity of the clogging condition, the remedial operation may or may not have been successful in removal of the clogging condition of the filter 30. As such, in some embodiments, the dishwasher 10 may be configured to check to determine whether the clogging condition has been removed, such as by any of the techniques described herein for detecting a clogging condition of the filter 30. For example, the dishwasher 10 may detect the water level and compare it to the normal water level. Likewise, the dishwasher 10 may detect the rate at which the water level changes and compare it to the normal rate at which the water level changes.

In some embodiments, the method 100 (shown in FIG. 4) may comprise, at operation 170, resuming operation of the dishwasher based on the recorded position of the wash cycle. For example, in an instance in which the clogging condition has been removed, the dishwasher 10 may be configured to resume operation of the dishwasher at a position of the wash cycle based at least on the recorded position after returning the water level to the "normal" or expected level. In some embodiments, as described above, the current position may have been recorded and, thus, it may be resumed accordingly. In such a manner, the dishwasher may efficiently detect and remove a clogging condition and resume operation at the appropriate position in the wash cycle. Thus, it may be unnecessary to restart the wash cycle from the beginning of the wash cycle.

In some cases, however, the dishwasher 10 may be configured to determine an appropriate position of the wash cycle to resume based on the current operating conditions and/or recorded position of the dishwasher 10. For example, if all the water has been removed from the dishwasher, it may be beneficial to begin with a position of the wash cycle that includes filling the tub with water. Thus, if the recorded position is near the end of the wash segment and the clogging condition has been removed, the dishwasher may proceed to the next wash segment rather than restating the wash cycle.

In some embodiments, the method 100 (shown in FIG. 4) may comprise, at operation 180, incrementing a remedy counter. For example, in some embodiments, in an instance in which the clogging condition has not yet been removed, the dishwasher 10 may be configured to increment a counter indicating the number of attempts to remove the clogging condition following execution of the remedial operation. In such a manner, the dishwasher 10 may track the number of attempts of executing each remedial operation. In some embodiments, the type of remedial operation executed may also be recorded. Additionally, there may be a set number of attempts (e.g., pre-determined or user configurable) for each remedial operation, such that if the maximum number of attempts has not occurred, the dishwasher 10 may attempt the remedial operation again. Alternatively, if the maximum number of attempts has occurred, then the dishwasher 10 may execute a second remedial operation.

In some embodiments, the method 100 (shown in FIG. 4) may comprise, at operation 195, assigning a next remedial action. For example, if the clogging condition has not yet been removed, in some embodiments, the dishwasher 10 may be configured to execute the remedial operation to repeat. Alternatively, in an instance in which the clogging condition has not yet been removed, in some embodiments, the dishwasher 10 may be configured to execute a second remedial operation. In some embodiments, the dishwasher 10 may be configured to determine the second remedial operation based on the degree at which the filter is clogged after execution of the first remedial operation.

Additionally or alternatively, in some cases, the second remedial operation may be ranked higher in degree than the first remedial operation in the list of remedial operations. Such a situation may correspond to the dishwasher 10 executing a remedial operation that is designed to remove a clogging condition that is more severe. In such a manner, the dishwasher may continue to execute higher ranking remedial operations in order until the clogging condition is removed.

However, in some embodiments, the dishwasher 10 may determine that a remedial operation that is ranked lower in degree in the list of remedial operations is more appropriate (e.g., the clogging condition has become less severe). Thus, some embodiments of the assigned remedial action may include a sequence of tiered remedial operations to remove a clogging condition. Such embodiments may allow for an intelligent and dynamic detection and removal of clogging conditions of a filter.

In some embodiments, the method 100 (shown in FIG. 4) may comprise, at operation 198, ceasing operation of the dishwasher. For example, in some cases, if the maximum number of attempts to remove the clogging condition has been reached, then the dishwasher may further comprise ceasing operation to avoid potential damage. In such a regard, in some embodiments, the dishwasher 10 may be configured to cease operation of the dishwasher in an instance in which the counter is greater than a threshold number. Additionally, in such a circumstance, in some embodiments, an error message may be indicated to the user with possible instructions, such as suggesting that the filter be cleaned.

FIG. 7 illustrates a flow chart showing another embodiment 200 of a method for detecting and removing a clogging condition of a filter in a dishwasher. As described with respect to FIG. 7, certain features or events may also reference specific steps in the flow chart of FIG. 4. The operations illustrated in and described with respect to FIG. 7 may, for example, be performed by, with the assistance of, and/or under the control of one or more components of the dishwasher 10 (e.g., control device 40, detection device 70, drain pump 42, circulation pump 50, water valve, etc.). Operation 201 may comprise determining a normal water level for a wash cycle of the dishwasher. The control device 40 may, for example, provide means for performing operation 201 as discussed above. Operation 202 may comprise monitoring a water level during execution of the wash cycle. The control device 40 and/or detection device 70 may, for example, provide means for performing operation 202 as discussed above. Operation 203 may comprise detecting the clogging condition of the filter, wherein the clogging condition is indicated by a deviation of the monitored water level from the normal water level. The control device 40 may, for example, provide means for performing operation 203 as discussed above.

Operation 204 may comprise determining a current position of the wash cycle being executed. The control device 40 may, for example, provide means for performing operation 204 as discussed above. Operation 205 may comprise executing a remedial operation to facilitate removal of the clogging condition from the filter. The control device 40, drain pump 42, circulation pump 50, and/or water valve may, for example, provide means for performing operation 205 as discussed above.

Operation 206 may comprise determining if the clogging condition has been removed following execution of the remedial operation. The control device 40 may, for example, provide means for performing operation 206 as discussed above. Operation 207 may comprise resuming operation of the dishwasher at an appropriate position of the wash cycle in an instance in which the clogging condition has been removed. The control device 40, drain pump 42, circulation pump 50, and/or water valve may, for example, provide means for performing operation 207 as discussed above.

In some embodiments, the dishwasher 10 may be configured to determine whether a remedial operation is warranted. FIG. 8 illustrates a flow chart showing one embodiment of a method 300 for detecting a clogging condition of a filter in a dishwasher and determining whether a remedial operation is warranted. The operations depicted in FIG. 8 may include any embodiments described herein. The operations illustrated in and described with respect to FIG. 8 may, for example, be performed by, with the assistance of, and/or under the control of one or more components of the dishwasher 10 (e.g., control device 40, detection device 70, drain pump 42, circulation pump 50, water valve, etc.).

In some embodiments, the method 300 may comprise, at operation 310, recording the current position of the wash cycle. As noted above, the position in the wash cycle may include a segment of the wash cycle (e.g., a wash segment). Then, at operation 320, the method 300 may comprise determining the normal water level based on the current position of the wash cycle.

In some embodiments, throughout the wash cycle, the method 300 may include, at operation 330, recording the average water level. Then, the method 300 at operation 340 may include determining if there is a significant deviation between the average water level and the normal water level. If there is not a significant deviation, the method 300 may include, at operation 360, returning to the wash cycle (such as at or near the current position of the wash cycle). If there is a significant deviation, the method 300 may include, at operation 350, determining if the fill interval is complete.

If the fill interval is not complete, the method 300 may include, at operation 360, returning to the wash cycle. In such situations, the filling of the water may not be complete and, thus, the filling should be completed before determining whether to apply a remedial operation. If the fill interval is complete, the method 300 may include, at operation 370, determining if a count is equal to zero.

If the count is equal to zero, then the method 300 may include, at operation 382, incrementing the counter to "1" and, at operation 384, adding sufficient fluid to obtain the normal water level (e.g., initiate a filling operation). Then, the method may include, at operation 386, returning to the wash cycle.

If the count is not equal to zero, the method may include, at operation 390, that a remedial operation is needed. Such a remedial operation may be determined by any embodiments described herein.

The method depicted in FIG. 4 and described above represents only one possible method for detecting and removing a clogging condition. Similarly, the method depicted in FIG. 7 and described above represents only one possible alternative method for detecting and removing a clogging condition. Along these lines, the method depicted in FIG. 8 and described above represent a method for detecting a clogging condition and determining whether a remedial operation is needed.

It is understood that the illustrated steps in FIGS. 4, 7, and 8 may be performed in any desired order and should not be limited to the illustrated embodiments. In some embodiments, certain ones of the steps described above may be modified, omitted, or further amplified. Furthermore, in some embodiments, additional optional steps may be included. Modifications, additions, omission, or amplifications to the steps above may be performed in any order and in any combination. The particular methods of detecting and removing a clogging condition will depend on any number of considerations, such as the degree of the clogging condition, the position in the wash cycle, the number of attempts to remove the clogging condition, and the type and degree of the remedial actions executed.

FIGS. 4, 7, and 8 illustrate flowcharts of methods, systems and program products according to various embodiments of the present invention. It will be understood that each block or step of the flowchart, and combinations of blocks in the flowchart, can be implemented by computer program instructions. These computer program instructions may be loaded onto a computer, processor, or other programmable apparatus to produce a machine, such that the instructions which execute on the computer, processor, or other programmable apparatus create means for implementing the functions specified in the flowchart block(s) or step(s). These computer program instructions may also be stored in a computer-readable memory that can direct a computer, processor, or other programmable apparatus to function in a particular manner, such that the instructions stored in the computer-readable memory produce an article of manufacture including instruction means which implement the function specified in the flowchart block(s) or step(s). The computer program instructions may also be loaded onto a computer, processor, or other programmable apparatus to cause a series of operational steps to be performed on the computer, processor, or other programmable apparatus to produce a computer implemented process such that the instructions which execute on the computer, processor, or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions, such as through control device 40.

Embodiments of the present invention may provide an effective means for detecting and removing a clogging condition of a filter of a dishwasher. One exemplary advantage of the present invention includes the ability of the dishwasher to handle heavy soil loads with a reduced risk of failure due to a clogging condition in the filter.

Additionally, in some embodiments, a further benefit may include optimization of wash cycles for soil removal. For example, due to a desire to limit water usage, many dishwashers are often configured to alternate pumping water between the upper spray arm and lower spray arm. Since, as noted above, the lower spray arm often includes jets that sweep the filter, the wash cycle of the dishwasher may be designed such that more time may be spent washing with the lower spray arm at the beginning of the wash cycle because it is often assumed that maximum soils are present at the beginning of the wash cycle. Moreover, during operation of the upper spray arm, water may not be circulated through the lower spray arm for sweeping soils off the filter. Therefore, the time that the upper spray arm may be operated can depend upon the capacity of the filter, not on what may be optimal for removing soils from dishware. In other words, there may be a limit to how much soil can be removed from the dishware and other utensils by the upper spray arm before the filter is completely clogged with food, thereby preventing water from reaching the circulation pump. By applying the methods described in embodiments of the present invention, the wash cycle may be designed to focus on optimal steps for soil removal and can allow the wash cycle to automatically modify itself for the heaviest soils when needed.

Another benefit of some embodiments of the present invention may include that heavy soil loads can be handled with reduced risk of failure due to a clogging condition of the filter. Indeed, the dynamic operation of the dishwasher can adapt to account for the onset of a clogging condition, thereby anticipating that a clogging condition is going to occur.

Another potential advantage is that the duration of dry operation of the circulation pump (e.g., operation without sufficient levels of water) can be lowered or avoided and so the risk of damage to the dishwasher and/or the circulation pump may be lessened. In some embodiments, a low water level may be recognized and, thus, operation of the circulation pump may be avoided to prevent damage. By doing so, the reliability of the circulation pump can be improved and repair costs avoided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

The invention claimed is:

1. A method for detecting and removing a clogging condition of a filter in a dishwasher, the method comprising:
   determining at least one of a normal water level for a wash cycle of the dishwasher or a normal rate at which the water level changes during the wash cycle;
   monitoring at least one of a current water level during execution of the wash cycle or a current rate at which the water level changes during execution of the wash cycle;
   detecting the clogging condition of the filter, wherein the clogging condition is indicated by at least one of a deviation of the monitored current water level from the normal water level or a deviation of the monitored current rate of water level change from the normal rate of water level change;
   determining a degree of the clogging condition of the filter that corresponds to an amount of water capable of passing through the filter;
   determining, based on the degree of the clogging condition of the filter, a remedial operation from among a plurality of different remedial operations to execute to facilitate removal of the clogging condition;

determining a current position of the wash cycle within the wash cycle being executed;

executing the determined remedial operation to facilitate removal of the clogging condition from the filter;

determining if the clogging condition has been removed following execution of the remedial operation;

resuming operation of the dishwasher based at least on the current position if the clogging condition has been removed; and performing at least one ceasing operation of the dishwasher, ceasing operation of a component of the dishwasher, executing the determined remedial operation again, or executing a second remedial operation if the clogging condition has not been removed, wherein the plurality of different remedial operations include at least one different step relative to one another.

2. The method according to claim 1, wherein the plurality of remedial operations are arranged in a list that, defines a hierarchy that corresponds to the degree of the clogging condition of the filter, and wherein determining the remedial operation to execute comprises selecting the remedial operation from the list based on a relationship between a position of the remedial operation in the hierarchy and the degree of the clogging condition.

3. The method according to claim 2, wherein the determined remedial operation defines a first remedial operation, wherein the method further comprises:

determining, in an instance in which the clogging condition has not been removed, the second remedial operation from the list of remedial operations, wherein the second remedial operation is ranked higher in position in the hierarchy than the first remedial operation; and executing the second remedial operation.

4. The method according to claim 1, wherein determining the remedial operation to execute comprises determining the remedial operation based on predefined rules.

5. The method according to claim 1, wherein executing the remedial operation comprises executing at least one of the following remedial operations: adding water above the filter, adding water below the filter, operating a circulation pump at a reduced speed, pulsing operation of the circulation pump, or operating a drain pump.

6. The method according to claim 1 further comprising:

incrementing a counter indicating a number of attempts to remove the clogging condition following execution of the remedial operation if the clogging condition has not been removed; and ceasing operation of the dishwasher when the counter is greater than a threshold number.

7. The method according to claim 1, wherein determining at least one of the normal water level or the normal rate at which the water level changes comprises determining the normal rate at which the water level changes during the wash cycle, wherein monitoring at least one of the current water level or the current rate at which the water level changes comprises monitoring the current rate at which the water level changes during the wash cycle, and wherein the clogging condition is indicated by the deviation of the monitored current rate of water level change from the normal rate.

8. The method according to claim 7, wherein determining the remedial operation to execute comprises determining the remedial operation based on a degree of difference between the monitored rate at which the water level changes and the normal rate at which the water level changes.

9. The method according to claim 7, wherein monitoring the current rate at which the water level changes comprises monitoring the current rate at which the water level changes with at least one detection device positioned below the filter.

10. The method according to claim 7, wherein monitoring the current rate at which the water level changes comprises monitoring the current rate at which the water level changes with at least one detection device positioned above the filter.

11. The method according to claim 1, wherein determining at least one of the normal water level or the normal rate at which the water level changes comprises determining the normal water level during the wash cycle, wherein monitoring at least one of the current water level or the current rate at which the water level changes comprises monitoring the current water level during the wash cycle, and wherein the clogging condition is indicated by the deviation of the monitored current water level from the normal water level.

12. The method according to claim 11, wherein monitoring the current water level comprises monitoring the current water level with at least one pressure sensor.

13. The method of claim 1, further comprising executing the determined remedial operation again if the clogging condition has not been removed.

* * * * *